(12) United States Patent
Krueger

(10) Patent No.: US 11,442,771 B2
(45) Date of Patent: Sep. 13, 2022

(54) CONSTRAINTS ON UPDATING OR USAGE OF MEMORY SYSTEM COMPONENT RESOURCE CONTROL PARAMETERS

(71) Applicant: Arm Limited, Cambridge (GB)

(72) Inventor: Steven Douglas Krueger, Austin, TX (US)

(73) Assignee: Arm Limited, Cambridge (GB)

( * ) Notice: Subject to any disclaimer, the term of this patent is extended or adjusted under 35 U.S.C. 154(b) by 275 days.

(21) Appl. No.: 16/732,654

(22) Filed: Jan. 2, 2020

(65) Prior Publication Data

US 2021/0208924 A1 Jul. 8, 2021

(51) Int. Cl.
| | |
|---|---|
| *G06F 9/50* | (2006.01) |
| *G06F 9/46* | (2006.01) |
| *G06F 3/06* | (2006.01) |
| *G06F 9/54* | (2006.01) |
| *G06F 11/07* | (2006.01) |

(52) U.S. Cl.
CPC ............ *G06F 9/467* (2013.01); *G06F 3/0619* (2013.01); *G06F 3/0631* (2013.01); *G06F 3/0644* (2013.01); *G06F 3/0679* (2013.01); *G06F 9/5016* (2013.01); *G06F 9/542* (2013.01); *G06F 11/0772* (2013.01); *G06F 2209/503* (2013.01); *G06F 2209/504* (2013.01)

(58) Field of Classification Search
CPC .... G06F 9/5016; G06F 3/0631; G06F 3/0644; G06F 3/0679
See application file for complete search history.

(56) References Cited

U.S. PATENT DOCUMENTS

| | | |
|---|---|---|
| 2018/0203609 A1 | 7/2018 | Krueger |
| 2018/0203610 A1 | 7/2018 | Krueger |
| 2018/0203807 A1* | 7/2018 | Krueger .............. G06F 12/1045 |

OTHER PUBLICATIONS

International Search Report and Written Opinion of the International Searching Authority for PCT/GB2020/053195 dated Mar. 16, 2021, 16 pages.
V. Selfa et al, "Application Clustering Policies to Address System Fairness with Intel's Cache Allocation Technology" 2017 26th International Conference on Parallel Architectures and Compilation Techniques, Sep. 9, 2017, pp. 194-205.
N. El-Sayed et al, "KPart: A Hybrid Cache Partitioning-Sharing Technique for Commodity Multicores" 2018 IEEE International Symposium on High Performance Computer Architecture, Feb. 24, 2018, pp. 104-117.

(Continued)

*Primary Examiner* — Edward J Dudek, Jr.
(74) *Attorney, Agent, or Firm* — Nixon & Vanderhye P.C.

(57) ABSTRACT

Memory transactions can be tagged with a partition identifier selected depending on which software execution environment caused the memory transaction to be issued. A memory system component can control allocation of resources for handling the memory transaction or manage contention for said resources depending on a selected set of memory system component parameters selected depending on the partition identifier specified by the memory transaction. Programmable constraint storage circuitry stores at least one resource control parameter constraint used to constrain updating or usage of memory system component resource control parameters.

20 Claims, 14 Drawing Sheets

(56) References Cited

OTHER PUBLICATIONS

"Improving Real-Time Performance by Utilizing Cache Allocation Technology, Enhancing Performance via Allocation of the Processor's Cache", White Paper, Intel, Apr. 2015, 16 pages.

Khang N., "Introduction to Cache Allocation Technology in the Intel® Xeon® Processor E5 v4 Family", Intel® Software, submitted Feb. 11, 2016, printed Jul. 11, 2016, 4 pages, https://software.intel.com/en-us/articles/introduction-to-cache-allocation-technology.

Khang N., "Benefits of Intel® Cache Monitoring Technology in the Intel® Xeon® Processor E5 v3 Family", Intel® Software, submitted Sep. 8, 2014, printed Jul. 11, 2016, 2 pages, https://software.intel.com/en-us/blogs/2014/06/18/benefit-of-cache-monitoring.

Khang N., "Introduction to Memory Bandwidth Monitoring in the Intel® Xeon® Processor E5 v4 Family", Intel® Software, submitted Feb. 11, 2016, printed Jul. 11, 2016, 3 pages, https://software.intel.com/en-us/articles/introduction-to-memory-bandwidth-monitoring.

\* cited by examiner

11,442,771 B2

CONSTRAINTS ON UPDATING OR USAGE OF MEMORY SYSTEM COMPONENT RESOURCE CONTROL PARAMETERS

BACKGROUND

Technical Field

The present technique relates to the field of data processing.

TECHNICAL BACKGROUND

Two or more software execution environments, such as applications or virtual machines, may be executed on the same data processing system with access to a common memory system shared between software execution environments. For some systems it may be important that the performance of one software execution environment is not held back due to another software execution environment using too much resource in the shared memory system. This problem can be referred to as the "noisy neighbour" problem and can be particularly significant for enterprise networking or server systems for example.

SUMMARY

At least some examples provide an apparatus comprising: processing circuitry to process instructions from one of a plurality of software execution environments; and a memory system component to handle memory transactions issued by the processing circuitry in response to the instructions; in which: in response to a memory transaction issued by the processing circuitry specifying a partition identifier selected depending on which software execution environment caused the memory transaction to be issued, the memory system component is configured to control allocation of resources for handling the memory transaction or manage contention for said resources depending on a selected set of one or more memory system component resource control parameters, said selected set selected from among a plurality of sets of one or more memory system component resource control parameters depending on the partition identifier specified by the memory transaction; the memory system component comprises programmable constraint storage circuitry to store at least one resource control parameter constraint; and based on said at least one resource control parameter constraint stored in said programmable constraint storage circuitry, the memory system component is configured to constrain at least one of: updating of a target memory system component resource control parameter; and usage of the target memory system component resource control parameter for controlling said allocation of resources or managing contention for said resources.

At least some examples provide an apparatus comprising: means for processing instructions from one of a plurality of software execution environments; and means for handling memory transactions issued by the means for processing in response to the instructions; in which: in response to a memory transaction issued by the means for processing specifying a partition identifier selected depending on which software execution environment caused the memory transaction to be issued, the means for handling memory transactions is configured to control allocation of resources for handling the memory transaction or manage contention for said resources depending on a selected set of one or more memory system component resource control parameters, said selected set selected from among a plurality of sets of one or more memory system component resource control parameters depending on the partition identifier specified by the memory transaction; the means for handling memory transactions comprises means for programmably storing at least one resource control parameter constraint; and based on said at least one resource control parameter constraint stored in said means for programmably storing, the means for handling memory transactions is configured to constrain at least one of: updating of a target memory system component resource control parameter; and usage of the target memory system component resource control parameter for controlling said allocation of resources or managing contention for said resources.

At least some examples provide a method comprising: processing instructions from one of a plurality of software execution environments; and handling memory transactions issued in response to the instructions; in which: in response to a memory transaction specifying a partition identifier selected depending on which software execution environment caused the memory transaction to be issued, a memory system component controls allocation of resources for handling the memory transaction or manages contention for said resources depending on a selected set of one or more memory system component resource control parameters, said selected set selected from among a plurality of sets of one or more memory system component resource control parameters depending on the partition identifier specified by the memory transaction; and based on at least one resource control parameter constraint stored in programmable constraint storage circuitry, constraining at least one of: updating of a target memory system component resource control parameter; and usage of the target memory system component resource control parameter for controlling said allocation of resources or managing contention for said resources.

Further aspects, features and advantages of the present technique will be apparent from the following description of examples, which is to be read in conjunction with the accompanying drawings.

DESCRIPTION OF EXAMPLES

Figure 1:
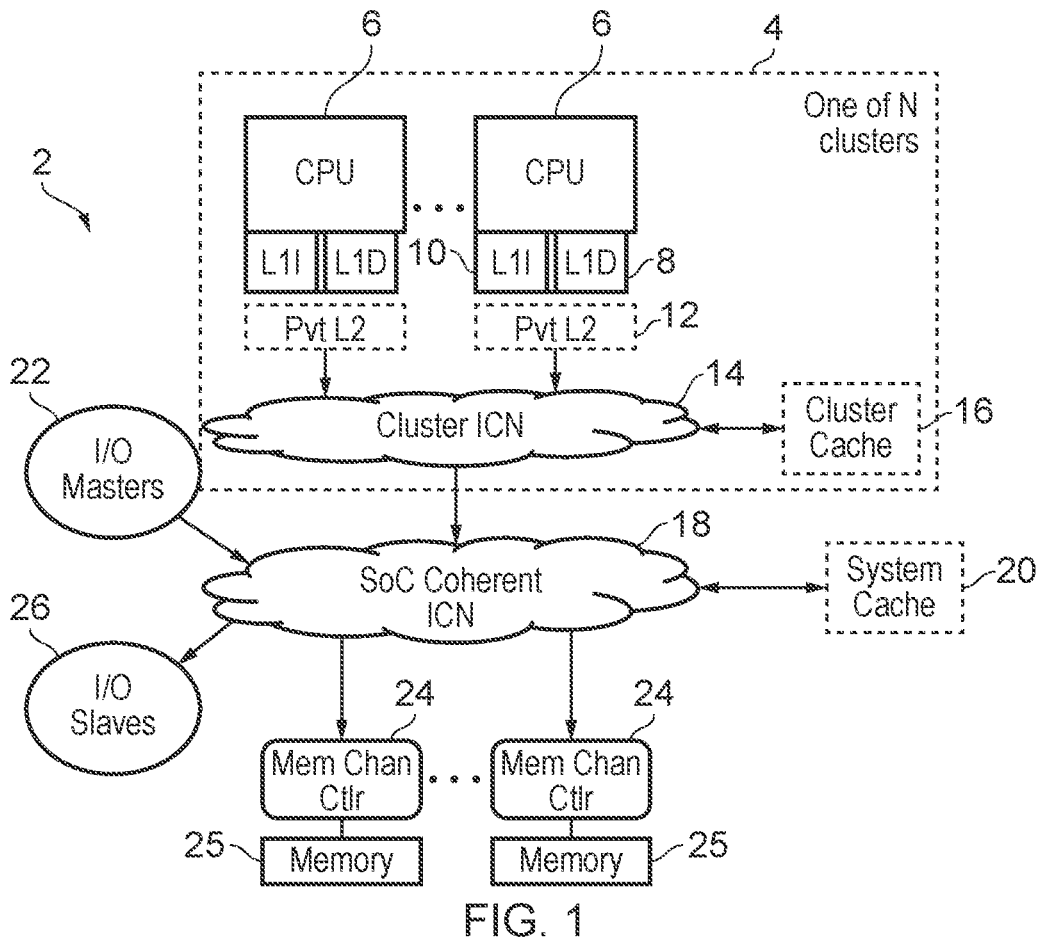
FIG. 1 schematically illustrates an example of a data processing system comprising a memory system.

An apparatus may have processing circuitry to process instructions from one of a number of software execution environments, and a memory system component for handling memory transactions issued by the processing circuitry in response to the instructions. Memory transactions can be assigned a partition identifier which is selected depending on which software execution environment caused the memory transaction to be issued. The memory system component can use the partition identifier to control allocation of resources or management of contention for resources depending on a set of memory system component parameters selected based on the partition identifier. Also, the partition identifier could be used to control whether performance monitoring data is updated in response to the memory transaction.

Hence, the processing circuitry may present partition identifiers as labels for memory transactions depending on which software issued the transaction. This means that resources in the memory system can be partitioned between software execution environments to avoid one software execution environment taking more than its fair share of resource, to address the noisy neighbour problem described above.

However, it is possible that there may be more than one software execution environment which is allowed to control the setting of the respective sets of memory system component parameters used by a memory system component to control allocation of resources, or manage contention for resources, for corresponding partition identifiers. Hence, while one software execution environment could set the respective sets of memory system component parameters so as to grant a software execution environment associated with one partition identifier a greater share of resource than a software execution environment associated with another partition identifier, this may not be effective if another controlling software execution environment is able to subsequently update the memory system component parameters so as to provide a different share of resources. This may compromise the running of the software execution environment which was expected to be allocated a greater share of resource.

For example, in one use case, a first controlling software execution environment may program the memory system component parameters so as to allocate a dedicated portion of resource for use by a real-time process, which should not be used by other processes. This can help to provide a guarantee on the maximum time expected for certain operations performed by the real-time process. However, if a second controlling software execution environment then subsequently changes the memory system component parameters to allow other non-real-time processes to access the dedicated resource, then this may violate the dedicated use expected by the real-time software execution environment, which may make it harder for the real-time processing to meet its real-time guarantees. Similar problems can arise between secure and non-secure software programming the control settings, where any resource partitioning used to enforce secure access to data from secure software only could be compromised if another process is able to overwrite the memory system component parameters to allow non-secure software to access the resource expected to be allocated for secure software.

In the techniques discussed below, a memory system component (MSC) is provided with programmable constraint storage circuitry for storing at least one resource control parameter constraint, which can be used to constrain updating or usage of a target memory system component resource control parameter. Hence, the resource control parameter constraint provides a way of enforcing certain bounds on (i) the updates allowed to be made to the resource control parameters maintained for a given MSC, and/or (ii) the effective value of the resource control parameter which is used, at the time of processing a memory transaction, to control allocation of resources or manage contention for resources. This can address the problems discussed above and provide assurance that, once a certain set of resource control parameters have been established, another controlling software execution environment is not able to change those parameters outside the bounds specified in the programmable constraint storage circuitry (or if the parameters are changed beyond the bounds, that these updated parameters are not observed at the time of usage), so that previously set resource control parameters can be respected.

Before discussing the use of such resource control parameter constraints in more detail, first a general architecture for setting partition identifiers for a software execution environment and using those partition identifiers to control resource allocation or management and/or performance monitoring in the memory system is described. After the general architecture has been described, the features of controlling updates or usage of memory system components resource control parameters based on resource control parameter constraints will be discussed in the section headed "Resource Control Parameter Constraints".

General Architecture for Memory Resource and Performance Monitoring Partitioning FIG. 1 schematically illustrates an example of a data processing system 2 comprising N processing clusters 4 (N is 1 or more), where each processing cluster includes one or more processing units 6 such as a CPU (central processing unit) or GPU (graphics processing unit). Each processing unit 6 may have at least one cache, e.g. a level 1 data cache 8, level 1 instruction cache 10 and shared level 2 cache 12. It will be appreciated that this is just one example of a possible cache hierarchy and other cache arrangements could be used. The processing units 6 within the same cluster are coupled by a cluster interconnect 14. The cluster interconnect may have a cluster cache 16 for caching data accessible to any of the processing units.

A system on chip (SoC) interconnect 18 couples the N clusters and any other master devices 22 (such as display controllers or direct memory access (DMA) controllers). The SoC interconnect may have a system cache 20 for caching data accessible to any of the masters connected to it. The SoC interconnect 18 controls coherency between the respective caches 8, 10, 12, 16, 20 according to any known coherency protocol. The SoC interconnect is also coupled to one or more memory controllers 24, each for controlling access to a corresponding memory 25, such as DRAM or SRAM. The SoC interconnect 18 may also direct transactions to other slave devices, such as a crypto unit for providing encryption/decryption functionality.

Hence, the data processing system 2 comprises a memory system for storing data and providing access to the data in response to transactions issued by the processing units 6 and other master devices 22. The caches 8, 10, 12, 16, 20, the interconnects 14, 18, memory controllers 24 and memory devices 25 can each be regarded as a component of the memory system. Other examples of memory system components may include memory management units or translation lookaside buffers (either within the processing units 6 themselves or further down within the system interconnect 18 or another part of the memory system), which are used for translating memory addresses used to access memory, and so can also be regarded as part of the memory system. In general, a memory system component may comprise any component of a data processing system used for servicing memory transactions for accessing memory data or controlling the processing of those memory transactions.

The memory system may have various resources available for handling memory transactions. For example, the caches 8, 10, 12, 16, 20 have storage capacity available for caching data required by a given software execution environment executing on one of the processors 6, to provide quicker access to data or instructions than if they had to be fetched from main memory 25. Similarly, MMUs/TLBs may have capacity available for caching address translation data. Also, the interconnects 14, 18, the memory controller 24 and the memory devices 25 may each have a certain amount of bandwidth available for handling memory transactions.

When multiple software execution environments executing on the processing elements 6 share access to the memory system, it can be desirable to prevent one software execution environment using more than its fair share of resource, to prevent other execution environments perceiving a loss of performance. This can be particularly important for data center (server) applications where there is an increasing demand to reduce capital expenditure by increasing the number of independent software processes which interact with a given amount of memory capacity, to increase utilization of the data center servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single SoC which previously would have been on separate SoCs. This again leads to a desire to limit performance interactions between software execution environments, and to monitor how those need to allow those independent processes to access the shared memory while limiting performance interactions.

Figure 2:
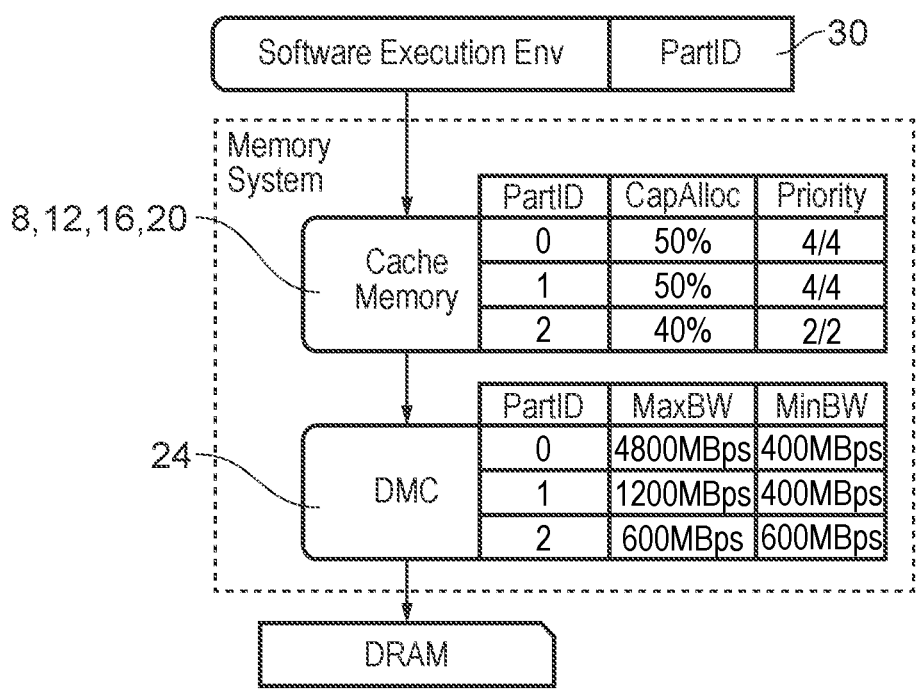
FIG. 2 schematically illustrates an example of partitioning control of memory system resources in dependence on a partition identifier allocated to a software execution environment associated with a memory transaction.

FIG. 2 schematically illustrates an example of partitioning the control of allocation of memory system resources in dependence on the software execution environment which issues the corresponding memory transactions. In this context, a software execution environment may be any process, or part of a process, executed by a processing unit within a data processing system. For example, a software execution environment may comprise an application, a guest operating system or virtual machine, a host operating system or hypervisor, a security monitor program for managing different security states of the system, or a sub-portion of any of these types of processes (e.g. a single virtual machine may have different parts considered as separate software execution environments). As shown in FIG. 2, each software execution environment may be allocated a given partition identifier 30 which is passed to the memory system components along with memory transactions that are associated with that software execution environment.

Within the memory system component, resource allocation or contention resolution operations can be controlled based on one of a number of sets of memory system component parameters selected based on the partition identifier. For example, as shown in FIG. 2, each software execution environment may be assigned an allocation threshold representing a maximum amount of cache capacity that can be allocated for data/instructions associated with that software execution environment, with the relevant allocation threshold when servicing a given transaction being selected based on the partition identifier associated with the transaction. For example, in FIG. 2 transactions associated with partition identifier 0 may allocate data to up to 50% of the cache's storage capacity, leaving at least 50% of the cache available for other purposes.

Similarly, in a memory system component such as the memory controller 24 which has a finite amount of bandwidth available for servicing memory transactions, minimum and/or maximum bandwidth thresholds may be specified for each partition identifier. A memory transaction associated with a given partition identifier can be prioritised if, within a given period of time, memory transactions specifying that partition identifier have used less than the minimum amount of bandwidth, while a reduced priority can be used for a memory transaction if the maximum bandwidth has already been used or exceeded for transactions specifying the same partition identifier.

These control schemes will be discussed in more detail below. It will be appreciated that these are just two examples of ways in which control of memory system resources can be partitioned based on the software execution environment that issued the corresponding transactions. In general, by allowing different processes to "see" different partitioned portions of the resources provided by the memory system, this allows performance interactions between the processes to be limited to help address the problems discussed above.

Similarly, the partition identifier associated with memory transactions can be used to partition performance monitoring within the memory system, so that separate sets of performance monitoring data can be tracked for each partition identifier, to allow information specific to a given software execution environment (or group of software execution environments) to be identified so that the source of potential performance interactions can be identified more easily than if performance monitoring data was recorded across all software execution environments as a whole. This can also help diagnose potential performance interaction effects and help with identification of possible solutions.

An architecture is discussed below for controlling the setting of partition identifiers, labelling of memory transactions based on the partition identifier set for a corresponding software execution environment, routing the partition identifiers through the memory system, and providing partition-based controls at a memory system component in the memory system. This architecture is scalable to a wide range of uses for the partition identifiers. The use of the partition identifiers is intended to layer over the existing architectural semantics of the memory system without changing them, and so addressing, coherence and any required ordering of memory transactions imposed by the particular memory protocol being used by the memory system would not be affected by the resource/performance monitoring partitioning. When controlling resource allocation using the partition identifiers, while this may affect the performance achieved when servicing memory transactions for a given software execution environment, it does not affect the result of an architecturally valid computation. That is, the partition identifier does not change the outcome or result of the memory transaction (e.g. what data is accessed), but merely affects the timing or performance achieved for that memory transaction.

Figure 3:
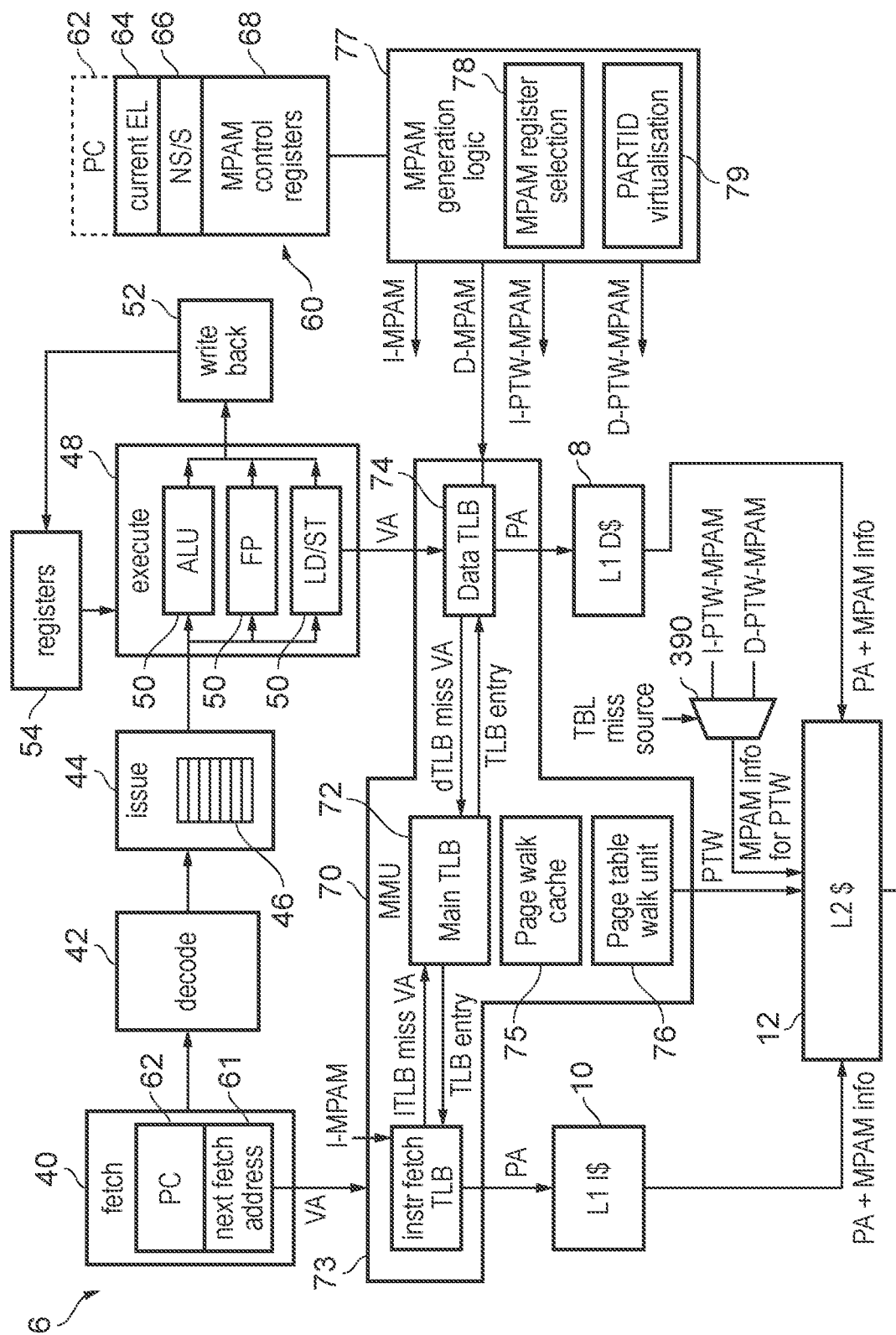
FIG. 3 schematically illustrates an example of processing circuitry for issuing memory transactions specifying a partition identifier.

FIG. 3 schematically illustrates an example of the processing unit 6 in more detail. The processor includes a processing pipeline including a number of pipeline stages, including a fetch stage 40 for fetching instructions from the instruction cache 10, a decode stage 42 for decoding the fetched instructions, an issue stage 44 comprising an issue queue 46 for queueing instructions while waiting for their operands to become available and issuing the instructions for execution when the operands are available, an execute stage 48 comprising a number of execute units 50 for executing different classes of instructions to perform corresponding processing operations, and a write back stage 52 for writing results of the processing operations to data registers 54. Source operands for the data processing operations may be read from the registers 54 by the execution stage 48. In this example, the execute stage 48 includes an ALU (arithmetic/logic unit) for performing arithmetic or logical operations, a floating point (FP) unit for performing operations using floating-point values and a load/store unit for performing load operations to load data from the memory system into registers 54 or store operations to store data from registers 54 to the memory system. It will be appreciated that these are just some examples of possible execution units and other types could be provided. Similarly, other examples may have different configurations of pipeline stages. For example, in an out-of-order processor, an additional register renaming stage may be provided for remapping architectural register specifiers specified by instructions to physical register specifiers identifying registers 54 provided in hardware, as well as a reorder buffer for tracking the execution and commitment of instructions executed in a different order to the order in which they were fetched from the cache 10. Similarly, other mechanisms not shown in FIG. 1 could still be provided, e.g. branch prediction functionality could be provided at the fetch stage to control generation of a next fetch address 61 based on predicted outcomes of branch instructions.

The processor 6 has a number of control registers 60, including for example a program counter register 62 for storing a program counter indicating a current point of execution of the program being executed, an exception level register 64 for storing an indication of a current exception level at which the processor is executing instructions, a security state register 66 for storing an indication of whether the processor is in a non-secure or a secure state, and memory partitioning and monitoring (MPAM) control registers 68 for controlling memory system resource and performance monitoring partitioning (the MPAM control registers are discussed in more detail below). It will be appreciated that other control registers could also be provided. The program counter register 62 is shown in FIG. 3 as being maintained by the fetch stage 40, but it may also be accessible to other stages, e.g. the execute stage 48.

The processor has a memory management unit (MMU) 70 for controlling access to the memory system in response to memory transactions. For example, when encountering a load or store instruction, the load/store unit issues a corresponding memory transaction specifying a virtual address. The virtual address is provided to the memory management unit (MMU) 70 which translates the virtual address into a physical address using address mapping data stored in one or more translation lookaside buffer (TLB)s 72, 73, 74. The TLBs may include a data TLB 74 acting as a level-1 TLB for data accesses initiated by the load/store unit 50, an instruction TLB 73 acting as a level-1 TLB for instruction fetch accesses initiated by the fetch stage 40, and a main TLB 72 acting as a shared level-2 TLB for both instruction and data accesses, which is accessed on a miss in the level-1 TLBs 73, 74. Each TLB 72-74 stores a number of TLB entries. Each TLB entry may identify not only the mapping data identifying how to translate the address, but also associated access permission data which defines whether the processor is allowed to read or write to addresses in the corresponding page of the address space. In some examples there may be multiple stages of address translation and so there may be multiple TLBs, for example a stage 1 TLB providing a first stage of translation for mapping the virtual address generated by the load/store unit 50 to an intermediate physical address, and a stage 2 TLB providing a second stage of translation for mapping the intermediate physical address to a physical address used by the memory system to identify the data to be accessed. The mapping data for the stage 1 TLB may be set under control of an operating system, while the mapping data for the stage 2 TLB may be set under control of a hypervisor, for example, to support virtualisation. It will be appreciated that the arrangement of TLBs shown in FIG. 3 is just one example, and other implementations could have a different set of TLBs.

In addition to the TLBs 72, 73, 74, the MMU may also comprise other types of cache, such as a page walk cache 75 for caching data used for identifying mapping data to be loaded into the TLB during a page table walk. The memory system may store page tables specifying address mapping data for each page of a virtual memory address space. The TLBs 72, 73, 74 may cache a subset of those page table entries for a number of recently accessed pages. If the processor issues a memory transaction to a page which does not have corresponding address mapping data stored in the TLBs 72, 73, 74 then a page table walk is initiated by page table walk unit 76. This can be relatively slow because there may be multiple levels of page tables to traverse in memory to identify the address mapping entry for the required page. To speed up page table walks, recently accessed page table entries of the page table can be placed in the page walk cache 75. These would typically be page table entries other than the final level page table entry which actually specifies the mapping for the required page. These higher level page table entries would typically specify where other page table entries for corresponding ranges of addresses can be found in memory. By caching at least some levels of the page table traversed in a previous page table walk in the page walk cache 75, page table walks for other addresses sharing the same initial part of the page table walk can be made faster. Alternatively, rather than caching the page table entries themselves, the page walk cache 75 could cache the addresses at which those page table entries can be found in the memory, so that again a given page table entry can be accessed faster than if those addresses had to be identified by first accessing other page table entries in the memory.

Figure 4:
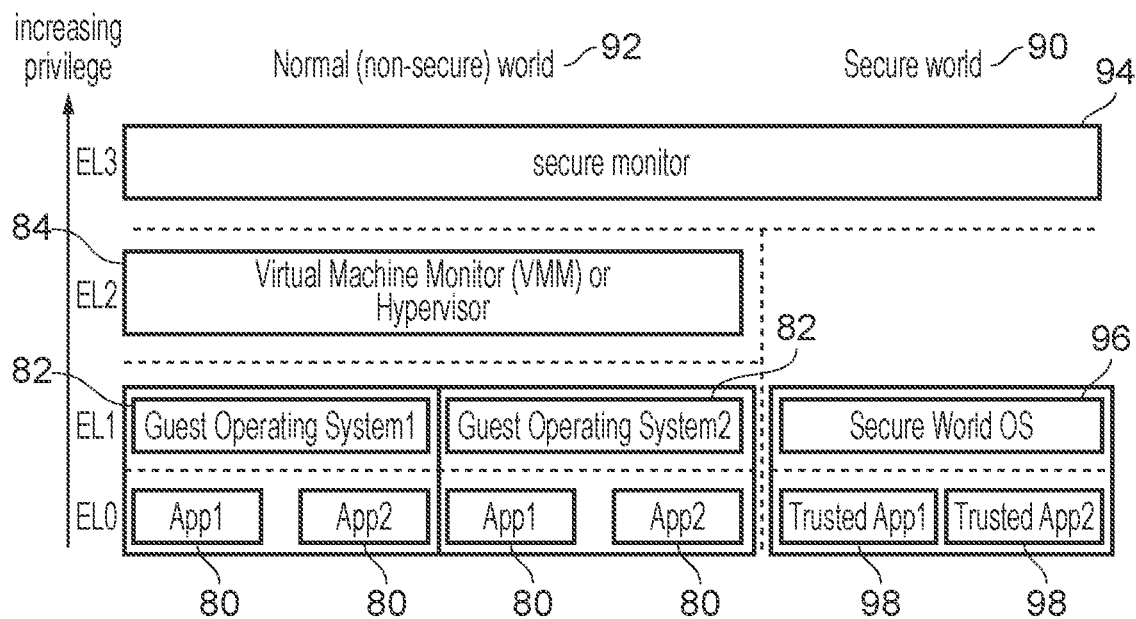
FIG. 4 shows an example of different software execution environments executed by the processing circuitry.

FIG. 4 shows an example of different software execution environments which may be executed by the processor 6. In this example the architecture supports four different exception levels EL0 to EL3 increasing in privilege level (so that EL3 has the highest privilege exception level and EL0 has the lowest privilege exception level). In general, a higher privilege level has greater privilege than a lower privilege level and so can access at least some data and/or carry out some processing operations which are not available to a lower privilege level. Applications 80 are executed at the lowest privilege level EL0. A number of guest operating systems 82 are executed at privilege level ED with each guest operating system 82 managing one or more of the applications 80 at EL0. A virtual machine monitor, also known as a hypervisor or a host operating system, 84 is executed at exception level EL2 and manages the virtualisation of the respective guest operating systems 82. It is possible that some applications at EL0 could be managed directly by the host operating system at EL2 without an intervening operating system at ED1.

Transitions from a lower exception level to a higher exception level may be caused by exception events (e.g. events required to be handled by the hypervisor or host operating system may cause a transition to EL2), while transitions back to a lower level may be caused by return from handling an exception event. Some types of exception events may be serviced at the same exception level as the level they are taken from, while others may trigger a transition to a higher exception state. The current exception level register 64 indicates which of the exception levels EL0 to EL3 the processing circuitry 6 is currently executing code in.

In this example the system also supports partitioning between a secure domain 90 and a normal (less secure) domain 92. Sensitive data or instructions can be protected by allocating them to memory addresses marked as accessible to the secure domain 90 only, with the processor having hardware mechanisms for ensuring that processes executing in the less secure domain 92 cannot access the data or instructions. For example, the access permissions set in the MMU 70 may control the partitioning between the secure and non secure domains, or alternatively a completely separate security memory management unit may be used to control the security state partitioning, with separate secure and non secure MMUs 70 being provided for sub-control within the respective security states. Transitions between the secure and normal domains 90, 92 may be managed by a secure monitor process 94 executing at the highest privilege level EL3. This allows transitions between domains to be tightly controlled to prevent non-secure operations 80 or operating systems 82 for example accessing data from the secure domain. In other examples, hardware techniques may be used to enforce separation between the security states and police transitions, so that it is possible for code in the normal domain 92 to branch directly to code in the secure domain 90 without transitioning via a separate secure monitor process 94. However, for ease of explanation, the subsequent description below will refer to an example which does use the secure monitor process 94 at EL3. Within the secure domain 90, a secure world operating system 96 executes at exception level ED and one or more trusted applications 98 may execute under control of that operating system 96 at exception level EL0. In this example there is no exception level EL2 in the secure domain 90 because virtualisation is not supported in the secure domain, although it would still be possible to provide this if desired. An example of an architecture for supporting such a secure domain 90 may be the TrustZone® architecture provided by Arm® Limited of Cambridge, UK. Nevertheless it will be appreciated that other techniques could also be used. Some examples could have more than two security states, providing three or more states with different levels of security associated with them. The security state register 66 indicates whether the current domain is the secure domain 90 or the non-secure 92 and this indicates to the MMU 70 or other control units what access permissions to use to govern whether certain data can be accessed or operations are allowed.

Figure 5:
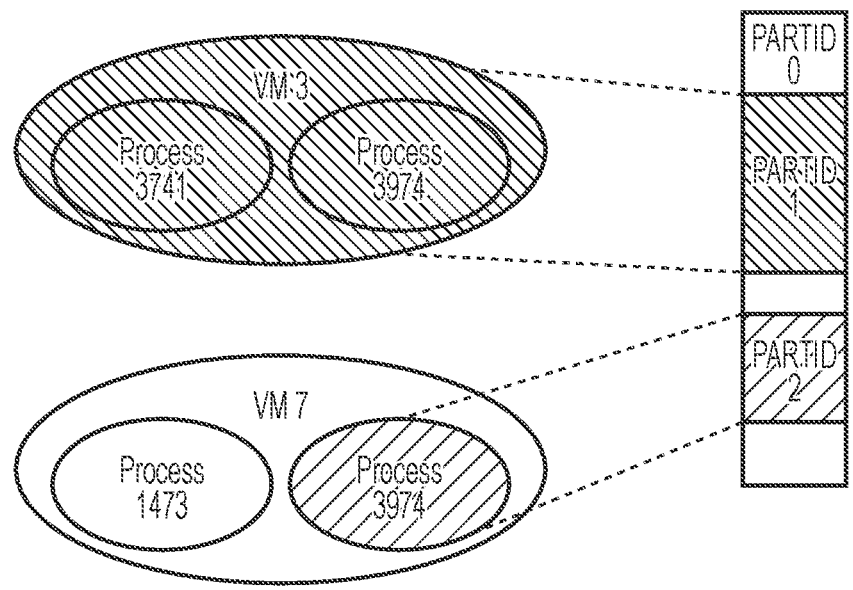
FIG. 5 illustrates an example of allocating partition identifiers to different software execution environments.

Hence, FIG. 4 shows a number of different software execution environments 80, 82, 84, 94, 96, 98 which can be executed on the system. Each of these software execution environments can be allocated a given partition identifier (partition ID or PARTID), or a group of two or more software execution environments may be allocated a common partition ID. In some cases, individual parts of a single processes (e.g. different functions or sub-routines) can be regarded as separate execution environments and allocated separate partition IDs. For example, FIG. 5 shows an example where virtual machine VM 3 and the two applications 3741, 3974 executing under it are all allocated PARTID 1, a particular process 3974 executing under a second virtual machine, VM 7, is allocated PARTID 2, and the VM7 itself and another process 1473 running under it is allocated PARTID 0. It is not necessary to allocate a bespoke partition ID to every software execution environment. A default partition ID may be specified to be used for software execution environments for which no dedicate partition ID has been allocated. The control of which parts of the partition ID space are allocated to each software execution environment is carried out by software at a higher privilege level, for example a hypervisor running at EL2 controls the allocation of partitions to virtual machine operating systems running at ED1. However, in some cases the hypervisor may permit an operating system at a lower privilege level to set its own partition IDs for parts of its own code or for the applications running under it. Also, in some examples the secure world 90 may have a completely separate partition ID space from the normal world 92, controlled by the secure world OS or monitor program EL3.

As shown in FIG. 3, the CPU may include MPAM generation logic 77 for generating the MPAM-related information to be associated with a given memory access transaction. The MPAM-related information may include at least the PARTID, but could also include other information in some examples (e.g. a performance monitoring group ID used to select which set of performance monitoring parameters a memory system component should update in response to a given memory access request). The MPAM generation logic 77 may include MPAM register selection logic 78 to select between partition ID registers of the MPAM control registers 68 to determine which register should be used for generating the MPAM-related information, and partition ID virtualisation logic 79 for controlling mapping of virtual partition IDs which are based on the information in the MPAM control registers 68 to physical partition IDs which are used by the memory system components to select the resource control settings. The MPAM generation logic 77 generates a number of alternative pieces of MPAM-related information, including instruction MPAM-related information (I-MPAM) to be used for instruction fetch accesses, data MPAM-related information (D-MPAM) to be used for data accesses, instruction page table walk MPAM-related information (I-PTW-MPAM) to be used for page table walk accesses triggered by an instruction fetch, and data page table walk MPAM-related information (D-PTW-MPAM) to be used for data page table walk MPAM-related information. The provision of separate MPAM-related information I-PTW-MPAM and D-PTW-MPAM for page table walk memory accesses can be useful so that page table walk memory accesses can have their resource usage controlled according to memory system component parameters defined for the process managing the page tables, rather than the process currently being executed.

It will be appreciated that the precise mechanism for determining which partition identifier to assign to a given memory request depending on the software execution environment associated with the request can vary considerably, and any such mechanism can be used at the processing element (CPU) 6. From the point of view of the memory system components such as a cache, interconnect or a memory controller, it does not matter how the partition identifier specified in a given memory request was selected at the CPU.

The partition ID and performance monitoring group ID appended to a given memory transaction (as well as, in some embodiments, a security state indication specifying the security state from which the transaction was issued) flow with the memory transaction throughout the memory system. Hence, nodes of the memory system (e.g. an interconnect) which pass memory transactions on to other components of the memory system provide the outgoing memory transactions with the same partition ID, performance monitoring group and security state indication as the corresponding request received at such nodes. For caches within the memory system, these have the behaviour of sometimes generating a response to the request if there is a cache hit, and other times passing it on to a further part of the memory system if there is a cache miss. They may also sometimes allocate new entries based on the request. When allocating new entries, the cache may store the partition ID, performance monitoring group and security indication of request which caused the allocation, alongside the cached data itself. When data is written back to a further cache or memory, the write back transaction is generated specifying the partition ID, performance monitoring group and security indication associated with the evicted data in the cache, rather than the IDs associated with the request which triggered the eviction. This allows resource allocation or performance monitoring for writebacks to be controlled/monitored according to the parameters specific to the software execution environment which allocated the corresponding data to the cache.

Note that not all of the memory system components (caches, interconnects, memory controllers, memory devices, or memory management units for example) may support partitioning. Components which do not support partitioning may control resource allocation or monitor performance in a common manner for all software execution environments. Nevertheless, outgoing requests are still appended with partition IDs in the same way as discussed above so that downstream memory system components which do support partitioning can use the partition IDs to select the appropriate set of parameters. Hence, regardless of whether the system designer actually chooses to use the partition IDs at any given memory system component, the processing element architecture and partition ID routing scheme discussed above provides the flexibility to support a range of implementations which implement partitioning at different points of the memory system. However, for such memory system components which do respond to the partition ID or the performance monitoring group ID, these can control resource allocation or contention management, or performance monitoring, based on the partition ID.

Performance monitors work differently from the resource partitioning controls. Performance monitors measure, count or calculate performance metrics based on filters programmed into the monitor. The filter parameters may include partition ID and performance monitoring group (or performance monitoring group but not partition ID). For example, a performance monitor that counts bytes transferred to memory might filter the measurements to only count reads with partition ID of 5 and performance monitoring group of 2. Hence, performance measurements can be collected for different software execution environments, or different groups of software execution environments, that share the same partition ID and performance monitoring group.

On the other hand, for system components which support resource partitioning, the memory system component selects a set of memory system component parameters based on the partition ID. The memory system component parameters may be resource control parameters which are used to control allocation of memory system resources (such as bandwidth, cache capacity, etc.) or contention for those resources (e.g. the selected memory system component parameters may define the priority set for transactions associated with the corresponding partition ID).

Figure 6:
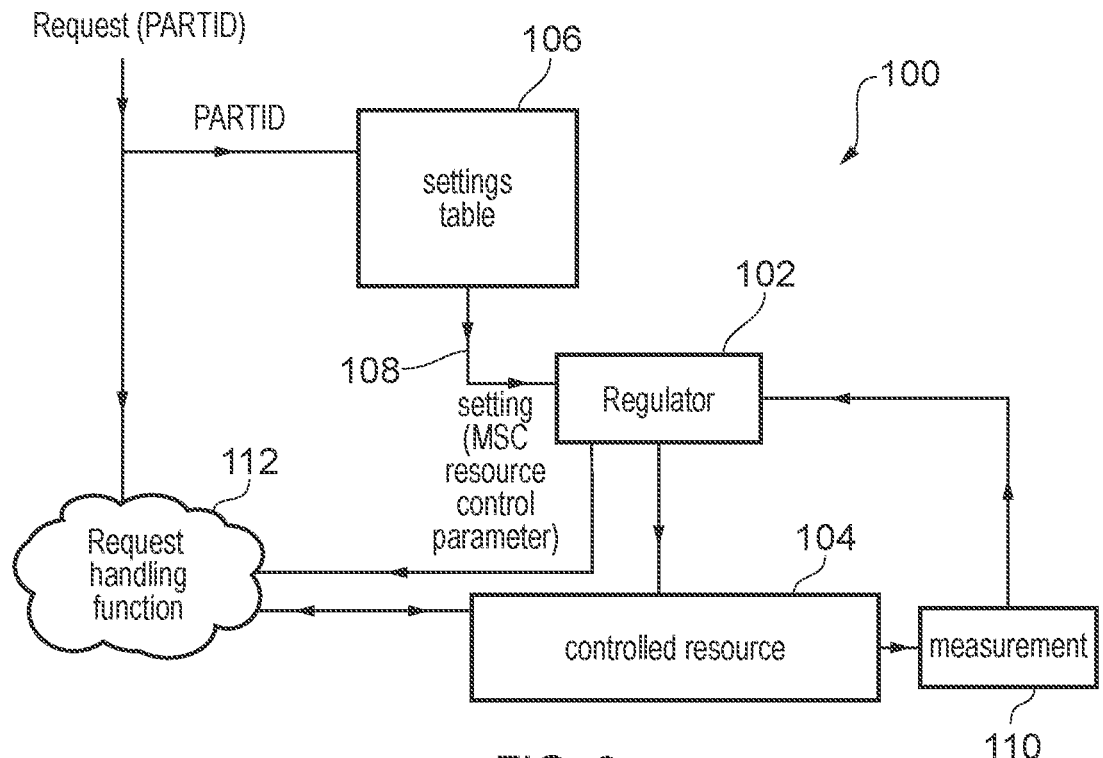
FIG. 6 illustrates an example of controlling memory system resource using at least one memory system component resource control parameter selected based on a partition identifier specified in a memory access request.

FIG. 6 shows an example of controlling resource partitioning using memory system component parameters selected based on the partition ID (PARTID). A memory system component 100 includes a regulator 102 for controlling access to a controlled resource 104 (e.g. cache capacity, bandwidth). The memory system component 100 has a settings table 106, which provides a number of entries, each entry corresponding to a given partition ID. The settings table 106 is indexed based on the PARTID specified in a received memory access request. While FIG. 6 shows one settings table, other examples which control more than one form of resource control may have a settings table 106 per implemented resource control. Each entry of the settings table specifies one or more partitioning control settings (memory system component resource control parameters) 108 for the corresponding PARTID. The settings could for example specify how much of the cache (or how much memory bus bandwidth) may be used for requests associated with the corresponding PARTID. Some forms of control (e.g. based on a maximum cache occupancy for a given PARTID) may depend on resource usage measurements made by measurement circuitry 110 (e.g. a count of how many cache entries have already been assigned for a given PARTID). Other forms of control may not require the measurement circuitry 110 (e.g. for a portion based cache control mechanism as described further below, measurement is not required). Hence, based on limits on resource usage for a given PARTID defined in the settings table 106, the regulator 102 controls how a request handling function 112 handles the incoming request, to avoid a particular software process assigned a given PARTID taking up more than its fair share of the controlled resource 104.

If the memory system component is a cache 8, 10, 16, 20, then the controlled resource 104 may be cache storage capacity. The regulator 102 may control allocation of data to the cache in response to a memory transaction, depending on the selected set of memory system component resource control parameters 108 in the settings table for the relevant PARTID. If the memory system component is an interconnect 14, 18 or memory controller 24, the regulator 102 may control allocation of bandwidth or buffer occupancy for handling the memory transaction, depending on the selected set of memory system component resource control parameters 108 in the settings table for the relevant PARTID.

Figure 7:
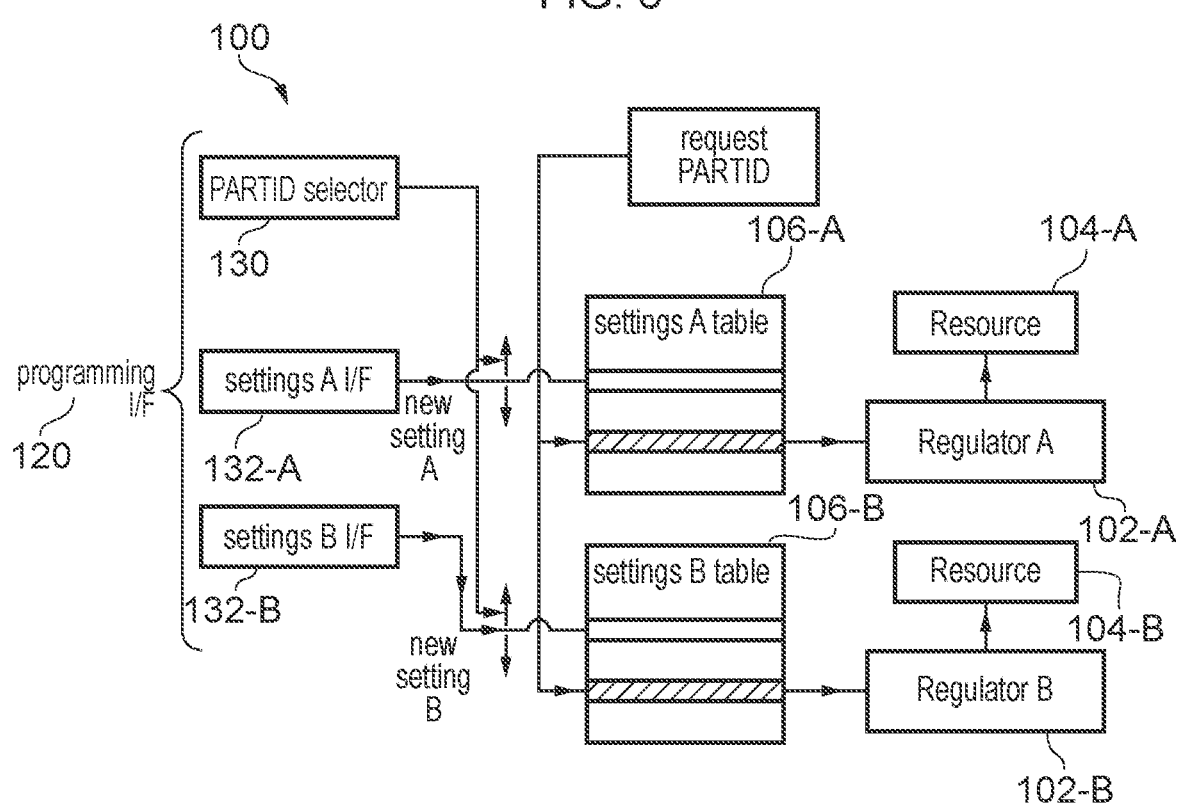
FIG. 7 illustrates a programming interface for updating memory system component resource control parameters.

FIG. 7 illustrates a programming interface 120 for updating the control settings in one or more settings tables 106. In this example there are two separate settings tables 106-A and 106-B for controlling respective regulators 102-A, 102-B to control access to respective types of controlled resource 104-A, 104-B. The programming interface 120 includes a PARTID selector 130 and a number of settings interface registers 132-A, 132-B. To set or read the control settings for a given PARTID, first a register within the PARTID selector 130 is written with the given PARTID, and then a read or write operation is performed to one or more interface registers 132-A, 132-B corresponding to the control settings to be updated (the read operation would return the values from the corresponding entry of the settings table, while the write operation would write new values to the corresponding entry of the settings table). The PARTID selector 130 selects the appropriate entry of the settings table(s) 106 to write or read based on the PARTID specified in its PARTID selection register.

The registers of the programming interface 120 are memory mapped registers which are accessed by the CPU 6 issuing a load/store operation specifying as its target address a memory address mapped to the corresponding register to be read/written. Hence, the PARTID selector 130 connects a common set of interface registers 132 to the relevant row(s) of the settings table(s) 106, avoiding the need for separate interface registers for each separate PARTID. The PARTID selector 130 effectively moves the "keyhole" used to access the settings tables 106 up and down the tables, to select the entry to be read or written.

In systems supporting separate secure and less secure address spaces, separate settings tables 106 and separate programming interfaces 120 can be provided for the secure and less secure address spaces respectively, to isolate the less secure domain from the secure domain.

Figure 8:
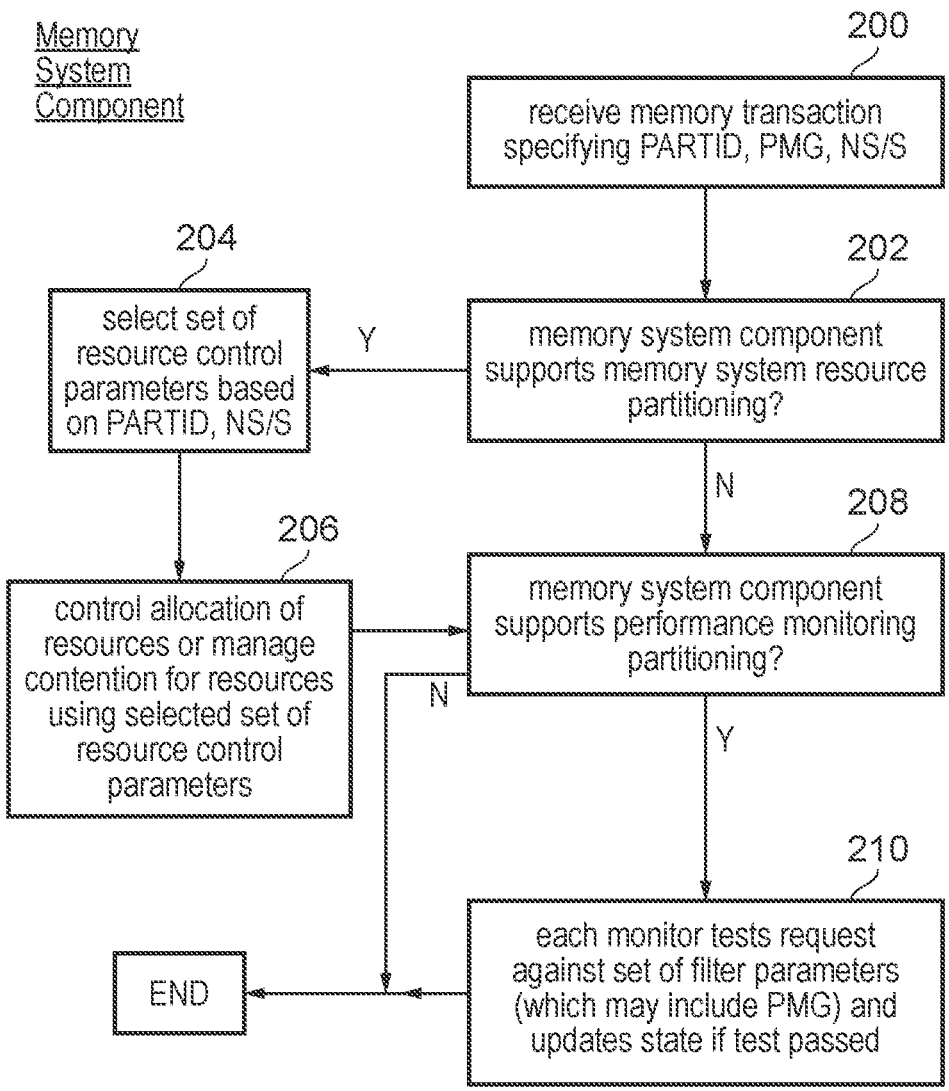
FIG. 8 is a flow diagram illustrating a method of responding to a memory transaction at a memory system component.

FIG. 8 shows a method for controlling the operation of the memory system component based on the partition ID. At step 200 the memory system component receives a memory transaction which specifies a partition ID, performance monitoring group (PMG) and a security state indication as discussed above. If the memory system component supports memory system resource partitioning (step 202), then at step 204 a set of resource control parameters is selected based on the partition ID and the security state. The performance monitoring group is not considered at this step. At step 206, allocation of resources is controlled using the selected set of resource control parameters, or contention for those resources is managed using the selected set of resource parameters. If memory system resource partitioning is not supported then steps 204 and 206 are omitted.

If the memory system component supports performance monitoring partitioning by performance monitoring group (step 208) then at step 210 each of the performance monitors implemented in the component tests the request against its filter parameters (which may include tests to be applied to the PMG and partition ID). Each monitor that has its filter parameters met updates its internal state according the measurement, count or calculation that monitor is designed to make. Step 210 is omitted for memory system components which do not support performance monitoring partitioning. In some embodiments both the partition ID field and PMG field may be included in the filter parameters (so that the PMG field further limits the partition ID field). Alternatively, PMG could be interpreted as an independent ID separate from the partition ID field, in which case the filter parameters may consider PMG but not partition ID.

Each memory system component which supports resource monitoring partitioning may have a set of parameter registers which store different sets of memory system component parameters, which are selected based on the partition ID. The control parameters for a partitioning control are logically an array of control parameters indexed by partition ID. The interface for setting control parameters could be arranged as an array of memory mapped registers, or could be arranged with a selector register and only a single configuration register per control parameter. In this latter case, the configuration software first stores a partition ID to configure into the selector register and then stores the desired control parameters in to the one or more control parameter configuration registers.

Figure 9:
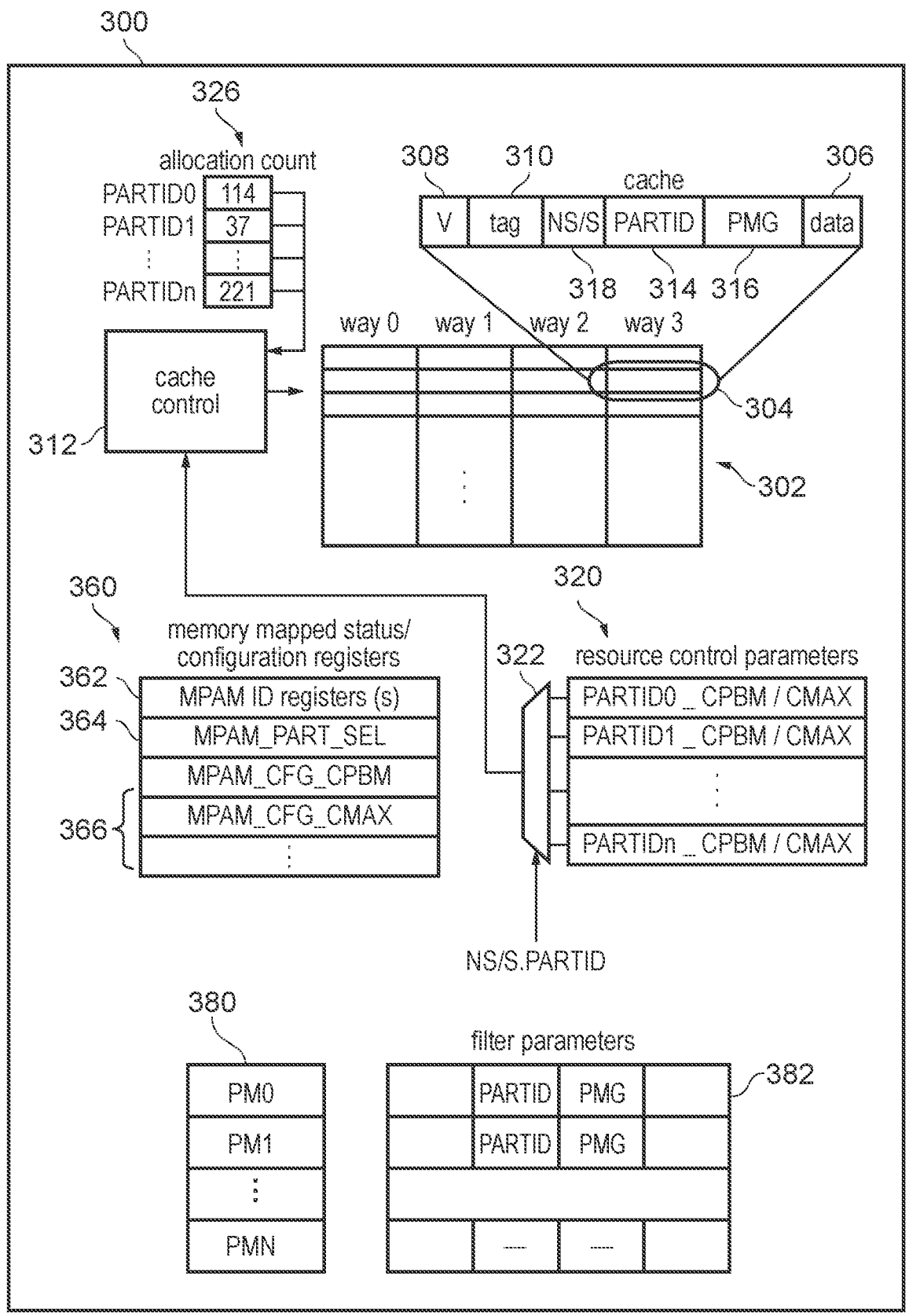
FIG. 9 shows an example of a cache which controls allocation of cache resource in dependence on the partition identifier and/or updates performance monitoring data selected based on a partition identifier.

FIG. 9 shows an example of a cache 300, which is one example of a memory system component. The cache 300 could be a cache for caching instructions or data, such as the level 1 data cache 8, level 1 instruction cache 10 or level 2 cache 12 of a given processing element 6, the cluster cache 16, or system cache 20. The cache 300 could also be a cache for address translation, such as the TLB 72 or page walk cache 74 in the MMU 70. While FIG. 3 shows an example where the MMU 70 is provided within a given processor core, it is also possible to provide system MMUs further down in the memory system, e.g. within the SoC interconnect 18.

The cache 300 has cache storage (cache RAM) 302 for storing the information to be cached. The cache RAM 302 has a certain number of storage entries 304. As shown in FIG. 9, each entry may store:

- the cached data 306 (which may be any cached information—encompassing not just data values but also instructions or address translation data depending on the type of cache),
- a valid bit 308 specifying whether the corresponding data in the entry is valid,
- a tag field 310 indicating a portion of the address associated with the cached data
- the partition ID 314 of the memory transaction that allocated the data into the cache
- the performance monitoring group ID 316 of the allocating memory transaction
- the security state indication 318 of the allocating memory transaction (which indicates which security state that memory transaction was issued from);
- other information that the system design may need to keep for each cache line, for example coherence state or address space indicator (ASI).

On evictions of data from the cache, the ID fields 314, 316, 318 are used to derive the partition ID, performance monitoring group ID and security state indication for the write back transaction. Although not illustrated in FIG. 9, each cache entry may also store coherency information specifying a coherency state of the cached data (e.g. whether the data is clean or dirty for determining whether a writeback is required), and/or victim selection data for selecting a victim cache line when an eviction is required (e.g. data for tracking which entries were least recently used).

Allocation of data to the cache may be controlled in accordance with any known cache organization, including direct-mapped, set-associative or fully associative. The example in FIG. 9 shows a set-associative organization scheme with 4 ways, but it will be appreciated this is just one example. Lookups to the cache are performed independently of the partition ID associated with the corresponding memory transaction. Hence, when a memory transaction specifying a given partition ID is received, the transaction can hit against any data within the indexed cache entries, without regard to the partition ID 314, non-secure ID indicator 318 and performance monitoring group 316 stored in cache entries. Therefore, the partitioning of performance resources and/or performance monitoring does not prevent different software processes sharing access to cached data.

On the other hand, when allocating data to the cache, a cache controller 312 controls allocation in dependence on a set of resource control parameters which is selected based on the security state and the partition ID of the corresponding memory transaction. The cache has a set of resource control parameter registers 320 (an example of the settings table 106 mentioned above), each register 320 storing the resource control parameters for a corresponding software execution environment. A selector 322 selects one of the registers based on the partition ID and the security state of the incoming memory transaction which requires allocation of data to the cache. The parameters stored in the selected register are used to control whether, and how, data is allocated to the cache.

In a first cache partitioning control mode, allocation is controlled using a maximum capacity threshold selected using the partition ID, which identifies a maximum number of entries of the cache capacity which are allowed to be allocated with data associated with the corresponding partition ID. In implementations supporting secure and non-secure states, the threshold may define a maximum capacity allowed to be allocated with data associated with a given combination of partition ID and non-secure ID indicator. For example, the maximum capacity threshold could be set by a higher privilege process, i.e. the threshold for a given operating system can be set by the hypervisor, and the threshold for a given application can be set by the operating system.

For example, FIG. 2 shows an example where partition IDs 0, 1 and 2 have been respectively assigned maximum capacity thresholds of 50%, 50% and 40% respectively. Note that the sum of the maximum capacity thresholds defined for the different software execution environments may exceed 100%, because these are only maximum limits for the amount of the cache which can store data for a given partition ID, not a guaranteed allocation. In this case, the corresponding software execution environments will not all simultaneously use their maximum allocation.

Returning to FIG. 9, the cache 300 has a set of allocation counters 326 for tracking how many of the cache entries 304 have been allocated for data associated with each partition ID. Where security states are supported, the counters may be further partitioned based on security state. When a data value for a given partition ID is allocated to the cache, the corresponding allocation counter 326 is incremented. When data is invalidated, evicted or replaced, the allocation count for the corresponding partition ID is decremented. When a cache miss occurs in response to a given memory transaction, the cache controller 312 reads the allocation counter 326 and resource control parameter register 320 corresponding to the partition ID specified by the memory transaction, compares the allocation count with the maximum capacity threshold, and controls allocation based on the result of the comparison. If the current allocation has not yet exceeded the threshold, the required data may be allocated to the cache. However, if the allocation count is equal to or exceeds the threshold, the cache controller 312 may either determine not to allocate any data for the new request, or may evict or replace other data associated with the same partition ID from the cache before allocating the new data, to prevent the cache being allocated with greater than the threshold level of entries associated with that partition ID. If an eviction or replacement is required, the partition IDs 314 (and if provided, the victim selection information) stored in each entry of the cache can be used to determine what data evict. It will be appreciated that the above means of counting capacity is just one example and other techniques may also be used to track cache capacity.

The resource control parameter registers 320 may represent the maximum number of entries indicated by the maximum capacity threshold in different ways. For example, they could directly specify the maximum number of entries which can be allocated to the corresponding partition IDs data. Alternatively, they may specify the threshold in terms of a fraction of the total capacity of the cache which can be allocated for that partition ID. For example, the parameter may represent a scaled percentage where the parameter's width and scale factor are specified in an ID register 362 for the corresponding memory component. For example, a component may support 8-bit capacity controls scaled by 256, in which case, to allocate 30% of the capacity to a given partition, the partition's maximum capacity parameter would be 0.30*256=76.8, rounded down to 76 to prevent the allocation exceeding the desired percentage.

In embodiments where multiple security states are supported, the security state indication is also used to select the appropriate resource control parameter register 320 and allocation count 326, in combination with the partition ID.

Figure 10:
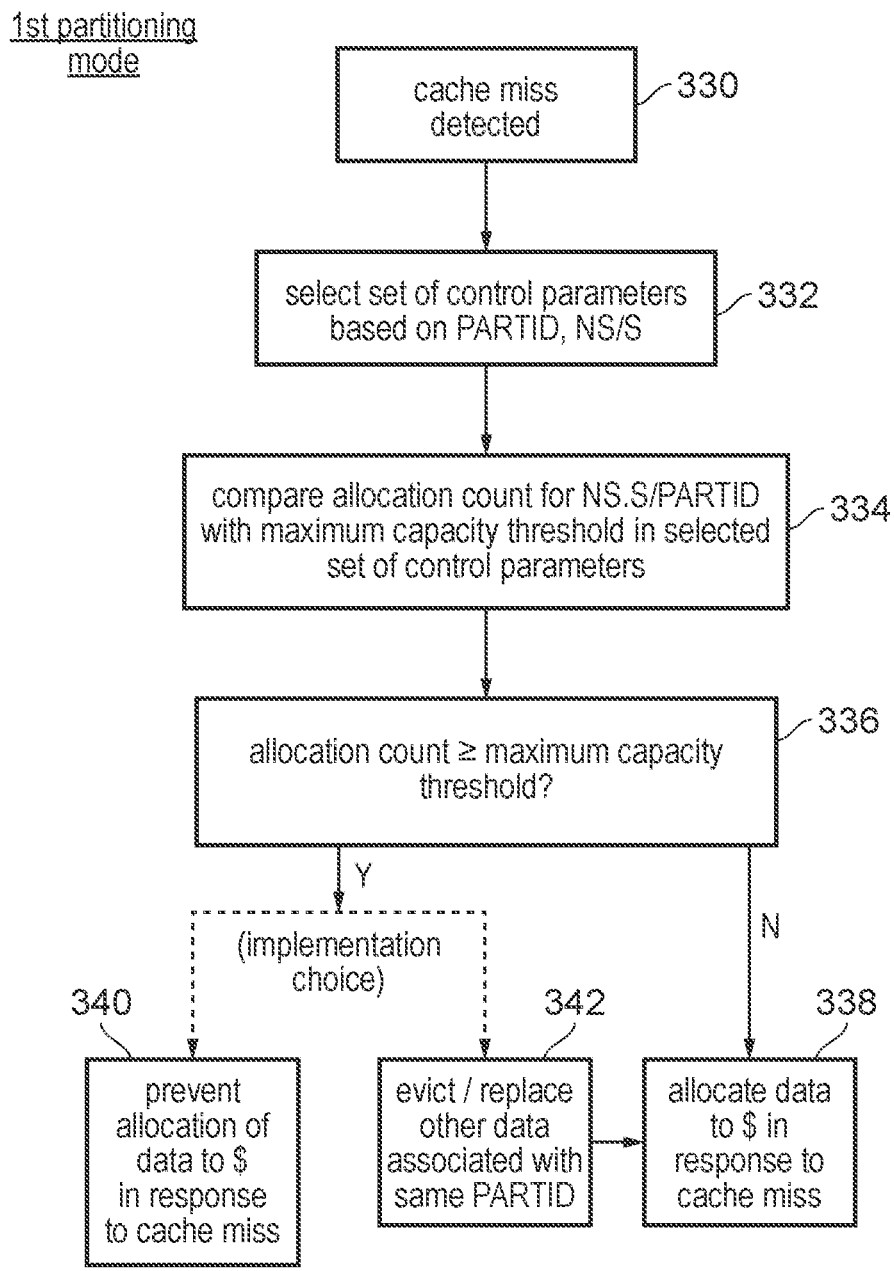
FIG. 10 is a flow diagram illustrating a method of controlling allocation to the cache in dependence on a capacity threshold selected in dependence on the partition identifier.

FIG. 10 shows a method of controlling cache allocation according to a maximum capacity threshold in the first partitioning control mode. At step 330, a cache miss is detected for a given memory transaction. At step 332 a set of resource control parameters 320 is selected based on the corresponding partition ID and security state. At step 334 the allocation count maintained by the counter 326 for the corresponding security state and partition ID is compared with the maximum capacity threshold in the selected set of resource control parameters 320, and at step 336 it is determined whether the allocation count is greater than the maximum capacity threshold. If not, then data for that request is allocated to the cache in response to the cache miss at step 338. On the other hand, if the allocation is greater than or equal to the allocation threshold then at step 340 allocation of the data to the cache is prevented or alternatively, at step 342 data associated with the same partition ID as the current request can be replaced or evicted to make way for the newly allocated data and the data can be allocated as normal at step 338 (the allocation count can sometimes exceed the threshold despite the limits provided by steps 340 or 342, e.g. if the threshold has recently been updated). Whether the method proceeds to step 340 or 342 is an implementation choice for a given implementation of cache.

Figure 11:
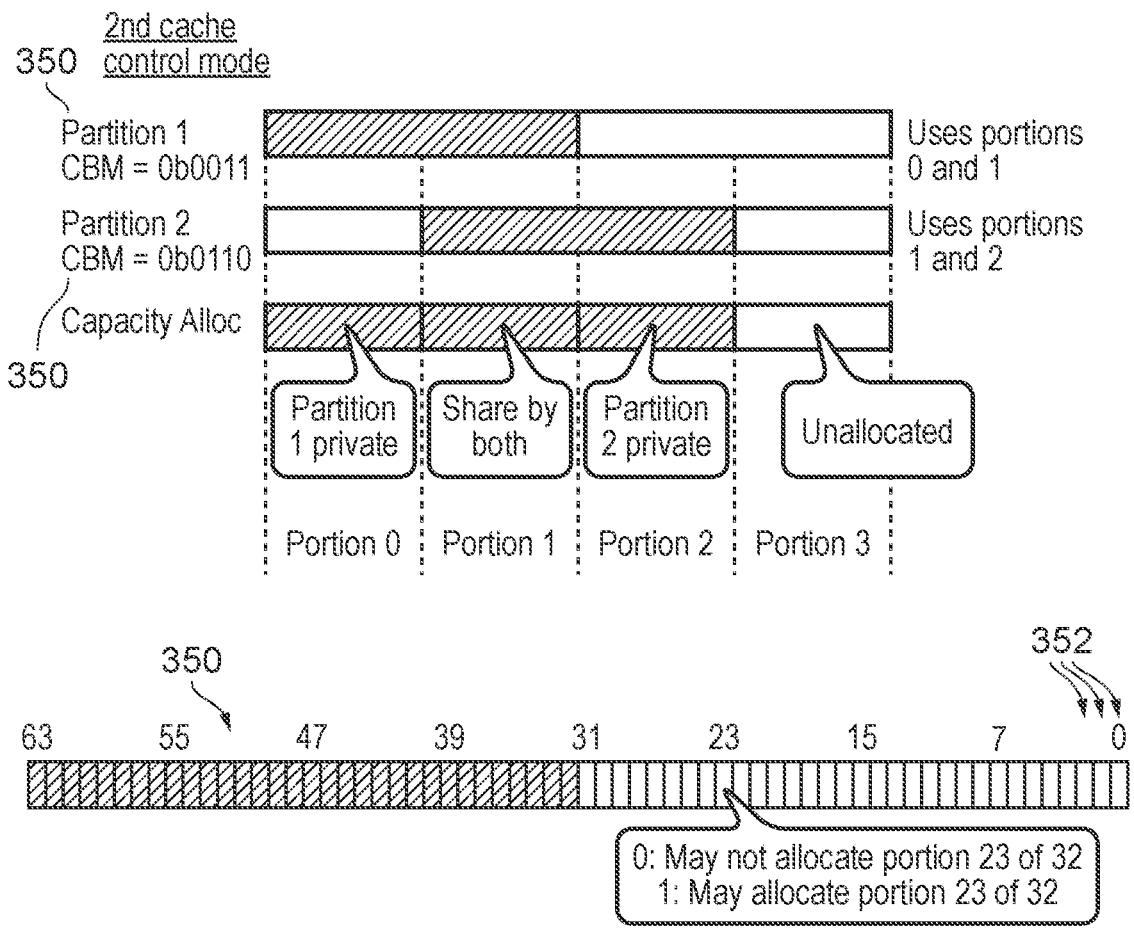
FIG. 11 illustrates an example of controlling which portions of the cache can be allocated with data in dependence on the partition identifier.

Alternatively, as shown in FIG. 11, a second cache control mode can be used in which a cache capacity portion bitmap 350 selected based on partition ID is used to control cache allocation. The bitmap 350 has multiple fields 352 which each specify whether a corresponding portion of the cache storage 302 is allowed to be allocated for storing data associated with the corresponding partition ID. For example, the bitmap 350 shown in the lower part of the example of FIG. 11 has 32 fields 352 each corresponding to $\frac{1}{32}^{nd}$ of the cache capacity. Each field may be set to 0 to indicate that the transactions specifying the corresponding partition ID cannot allocate data to that portion of the cache, or to 1 to indicate that the portion is allowed to be allocated with data for that partition ID.

As shown in the top part of FIG. 11, by setting different bitmaps 350 for different partition IDs, this allows some parts of the cache to be reserved for a given partition ID, while other parts may be shared among partition IDs or completely unallocated. For example, for the subset of 4 cache portions shown in FIG. 11 (this is not the whole cache capacity), portion 0 of the cache is allocated to partition 1 only, portion 1 is allocated to both partition 1 and partition 2 so that they may compete for allocations to this part of the cache, portion 2 is allocated to partition 2 only and portion 3 is not allocated to either of these partitions. Hence, when allocating data to the cache for partition 1 say, the cache controller 312 is restricted to selecting locations within portion 0 or 1, but cannot allocate to portions 2 or 3. The "portions" defined by the bitmap could be any group of one or more cache entries having the property that any given address can be allocated to at least one entry of the group, e.g. an entire way (including all sets belonging to that way) in a set-associative cache, or a more arbitrary subset of entries in a fully-associative cache.

Hence, with the second allocation control mode, when a cache miss is detected, again a set of control parameters for the corresponding partition ID and the security state is selected, but this time a cache bitmap is read and used to control which parts of the cache can be allocated with the data.

Some cache implementations may support only one of the first and second cache allocation control modes described above (e.g. a direct-mapped cache can implement the first mode but not the second mode). Other implementations may support the option to use both modes. For example, this could be useful because if the particular cache organization being used does not support giving many portions (e.g. a set-associative cache of relatively low associativity), then overlaying maximum capacity limits gives more control than portion partitioning alone.

As mentioned above, the cache 300 may have memory mapped configuration registers 360 for controlling how the resource partitioning is performed. This is an example of the programming interface 120 described above. The configuration registers 360 include an ID register 362 for identifying hardware capabilities of the cache 300, a selector register 364 for selecting a set of resource control parameters to update, and one or more configuration registers 366 for specifying the parameters to be written to the selected set of resource control parameters.

For example, the ID register 362 may specify which of the first/second cache allocation control modes are supported (threshold or bitmap based partitioning). For example, caches which do not have any allocation counters 326 may indicate that the first mode is not supported. In this case, the controlling processor may be restricted to using the second mode. Other caches may support both modes and have the flexibility to choose which is used for a given process. In this case, which mode to use may be specified within the resource control parameter register 320 for the corresponding partition ID, and programmed using the configuration registers 360.

When setting the set of resource control parameters for a given partition ID, software writes that partition ID to the selector register 364 and the parameters to be written to the corresponding configuration registers 366, by issuing memory transactions specifying the memory addresses mapped to those registers 364, 366. In response, the cache 300 reads the parameters from the configuration registers 366 and writes them to the corresponding resource control parameter register 320 identified by the relevant partition ID. When security states are supported, the selector register 364 and configuration registers 366 can be banked so that different versions are provided for the secure and less secure states respectively, with the security indication associated with the memory transaction selecting which set of registers is accessed.

Note that such a selector register 364 and configuration registers 366 to set the resource control parameters is just one example of how the resource control parameters could be set. The advantage of this approach is that it conserves address space usage in the memory system components. However, an alternative would be to use a wider interface where the array of control settings is exposed as an array of N control setting registers where N is the maximum number of partition IDs supported. This is simpler in that a control configuration can be updated for a partition with a single write and thus does not require mutual exclusion to prevent one processor accessing the selector register 364 and configuration registers 366 while another processor is configuring the memory system component. For example, if the maximum number of partition IDs is $2^{16}$ and a typical memory system component has 2 to 4 controls, this approach might use 256 KB of the address space for the array of resource control parameters.

Access to the memory mapped configuration registers 360 may be controlled by the MMU 70 for example, to limit which operating states can issue memory transactions for updating the configuration registers 360. For example, instructions executing at EL0 may not be allowed to access the configuration registers 360, but the hypervisor at EL2 may be allowed. When virtualisation of partition IDs is supported, the partition IDs used within the cache 300 are physical partition IDs, while an operating system attempting to set resource control parameters to be used for a partition ID of a corresponding application would specify a virtual partition ID. Therefore, to prevent the operating system updating the wrong resource control parameters, accesses to the addresses mapped to the configuration registers 360 may be trapped, and can trigger an exception to switch processing to the hypervisor at EL2. An exception handler in the hypervisor can then issue corresponding memory transactions with the correct physical partition ID to update the relevant set of parameters 320 at the cache 300. To achieve this, in a two stage MMU translation process, the address associated with the memory mapped registers 360 may be placed on a stage 2 address page which is different from other address space used by the memory system component.

In a similar way to the resource control partitioning, performance monitoring in the cache 300 may be partitioned based on the performance monitoring group (and partition ID in embodiments where the PMG is a sub-property of the partition ID) and the security state. A number of performance monitors 380 may be provided, each configurable to measure, count or calculate performance metrics based on filters programmed in a set of filter parameters 382 corresponding to that performance monitor 380. The filter parameters 382 may include fields for specifying a PARTID and PMG, and on receiving a memory transaction, if the filter parameters 382 have set a particular value for the PARTID/PMG fields then the performance monitor may determine whether to update its metric based on that transaction in dependence on whether the PARTID/PMG values associated with that transaction match the values set in the filter parameters 382. Note that in implementations supporting the first cache allocation mode, where allocation counters 326 are provided for tracking whether the allocation threshold is exceeded, the same allocation counters 326 may also be used for performance monitoring.

Where the cache 300 is an address translation cache, such as a TLB or page walk cache, the partitioning of cache allocation resources in this way can be useful to ensure that one software execution environment cannot allocate more than its allocated percentage/portions of the address translation cache capacity, to leave space for other software execution environments and reduce the "noisy neighbour" effect.

While FIG. 9 shows an example of a cache 300, other memory system components may have a similar set of memory mapped configuration registers 360 for configuring the memory system component parameters associated with a given partition ID/performance monitoring group/security state, and resource control parameter registers 320 for specifying sets of configuration data for corresponding partition IDs.

In particular, for other memory system components (such as a memory controller 24 or interconnect 14, 18 for example), any of the following forms of resource partitioning may be implemented:

Memory Channel Bandwidth Partitioning

The bandwidth of a main memory channel may be partitioned. Two bandwidth control schemes may be provided. A memory channel can optionally implement one or both of:
  Minimum bandwidth to which the partition has claim, even in the presence of contention
  Maximum bandwidth limit available to the partition in the presence of contention Any combination of these control schemes may be used simultaneously in a channel that supports them. Each control scheme is described in a section below.

Minimum Bandwidth Control Scheme

The minimum bandwidth control scheme gives requests from a partition preference when its current bandwidth is below the minimum and allows its requests to compete with other ordinary requests when it is above its minimum bandwidth. A partition's requests below its minimum bandwidth are thus most likely to get scheduled on the channel. The minimum bandwidth control scheme tracks memory bandwidth during an accounting period.

If the bandwidth usage by the partition as tracked during the accounting period is currently less than the partition's minimum, its requests are preferentially selected to use channel bandwidth.

If the bandwidth usage by the partition as tracked during the accounting period is currently greater than the partition's minimum, its requests compete with other ordinary preference requests to use bandwidth on the channel.

Bandwidth that is not used by a partition during an accounting window does not accumulate. A register within the memory system component may specify the minimum bandwidth limit for a given partition ID as scaled megabytes per second. The scaled value of megabytes per second is computed as the desired megabytes per second multiplied by a scale factor that may be defined by the hardware.

Maximum Bandwidth Limit Control Scheme

The maximum bandwidth limit control scheme gives a partition ordinary preference for up to its maximum bandwidth limit during an accounting period. If the bandwidth usage by the partition as tracked during the accounting period is currently less than the partition's maximum, its requests compete for scheduling on the memory channel with ordinary preference. If the bandwidth usage by the partition as tracked during the accounting period is currently greater than the partition's maximum bandwidth limit, its requests compete with other less preferred requests to use bandwidth on the channel.

The maximum bandwidth limit control scheme gives requests from a partition ordinary preference when the bandwidth usage is below the maximum bandwidth limit and non-preference when the bandwidth usage is over the maximum bandwidth limit. Thus in the absence of contention for channel bandwidth, the partition may use more than the maximum bandwidth. Requests for bandwidth when the partition's bandwidth usage is below its maximum limit are scheduled with ordinary priority, so depending on competing requests, not all of the partition's requested bandwidth below its maximum limit may be granted by the channel scheduler. Bandwidth that is not used by a partition during an accounting window does not accumulate.

Again, the control parameter for a maximum bandwidth limit may be specified as scaled megabytes per second. The scaled value of megabytes per second is computed as the desired megabytes per second multiplied by a scale factor that may be defined by the hardware.

If both the minimum bandwidth control scheme and the maximum bandwidth limit control scheme are implemented, the following table shows the preference of the request:

| If the utilized bandwidth is | | The preference is | Description |
| --- | --- | --- | --- |
| Below the minimum | | High | Only other High requests will delay this request* |
| Above the minimum | Below the maximum limit | Medium (ordinary) | High requests serviced first then compete with other Medium requests* |
| | Above the maximum limit | Low | Not serviced if any High or Medium requests are available* |

*Note
that while the preference may generally be defined as High, Medium or Low to increase the likelihood that High preference requests are serviced ahead of Medium or Low preference requests, implementations may still deviate from preference order in servicing requests to meet other goals of the implementation, such as starvation avoidance.

For all of the schemes discussed above, the control parameters for bandwidth partitioning schemes can all be expressed in a given unit, e.g. megabytes per second. This value is also equivalent to bytes transferred per microsecond. An implementation may require that each bandwidth partitioning control parameter be multiplied by a constant scaling factor before the resulting value is programmed into one of a memory system component's bandwidth control registers for a partition ID. Whether the implementation requires a scaling of the control parameter, and the scaling factor if required, may be specified in a discovery register within the memory system component (similar to the discovery register 362 of the cache described above).

For all the memory bandwidth partitioning schemes described above, memory channel bandwidth regulation may occur over an accounting period. The accounting period may be either a fixed or moving window. The width of the window may be a discoverable constant which can be read from a discovery register in the memory system component. For example, the accounting period may be at least one microsecond and it may be up to 20 microseconds or more. Longer accounting periods may require more hardware especially in moving window implementations while shorter accounting periods may have more boundary effects, especially in fixed window implementations.

In fixed window accounting, bandwidth is apportioned to requests so that each partition gets bandwidth according to the minimum and maximum for that partition. Request or local priorities can be used to resolve conflicting requests for bandwidth. When the accounting window's period is reached, a new window begins with no history except for any queue of requests that have not been previously serviced. The new window starts accumulating bandwidth from zero for each of the partitions.

With moving window accounting, the moving window keeps a history of bandwidth by partition from all commands issued in the past window width. There is no resetting of the accounting of bandwidth per partition, rather bandwidth is added when a command is processed and removed from the accounting when that command moves out of the window's history. This continuous accounting is relatively free from boundary effects, but requires more hardware to track the history of commands within the window in addition to the bandwidth counters per partition ID required by the fixed window.

The minimum bandwidth allocations of all partitions may sum to more bandwidth than is available. This is not a problem when some partitions are not using their bandwidth allocations as unused allocations are available for other partitions to use. However, when minimum bandwidth is over allocated, the minimum bandwidth that is programmed for partitions cannot always be met. Software can ensure that minimum bandwidth is not over allocated to assure that minimum bandwidth allocation programmed can be reliably delivered by the system.

Because available bandwidth may depend on one or more clock frequencies in many systems, for example DDR clock, software may wish to reallocate bandwidths when changing clocks that affect the bandwidth available. Lowering clock rates without changing allocations may result in over-allocation of bandwidth. Note: The available bandwidth on a DRAM channel is not a constant, but varies with the clock rate, the mix of reads and writes and the bank hit rate.

One skilled in the art will see that bandwidth controls of the types described are not limited to being used only at memory channel controllers, but may be deployed to control bandwidths at any memory system component.

Priority Partitioning

Unlike the other memory system resources listed in this document, priority doesn't directly affect the allocation of memory system resources, but instead has an effect on conflicts that arise for access to resources. A properly configured system should rarely have substantial performance effects due to prioritization, but priority does play an important role in oversubscribed situations whether instantaneous or sustained. Therefore, "priority partitioning" can be used as a tool to aid in isolating memory system effects between partitions.

A partition may be assigned priorities at each component in the memory system (that supports priority partitioning). This partitioning control allows different parts of the memory system to be set up to handle requests with different priorities. For example, requests from a processor to the system cache may be set to use a higher transport priority than those from the system cache to main memory.

Two types of priorities may be identified for each partition ID:

Internal priorities control priorities used in the internal operation of this memory system component. They can be used within the memory system component to prioritize internal operations. For example, a memory controller may use an internal priority to choose between waiting requests when bandwidth allocation doesn't pick a clear winner.

Downstream priorities control priorities communicated downstream to another memory system component (for example to an interconnect or memory controller). "Downstream" refers to the communication direction for requests. An "upstream" response usually uses the same transport priority as the request that generated it. A memory system component uses a downstream priority to indicate priority to a downstream component that does not have priority partitioning. This may be used to set transport priorities for an interconnect component that is downstream.

On the other hand, if a component doesn't implement priority partitioning, or it doesn't implement downstream priorities, it may use a "through priority"—the downstream priority is the same as the incoming (upstream) priority or requests. Similarly, the priority of a response that transits through a memory system component (from downstream to upstream) is the same priority as the response received (from downstream).

Resource Control Parameter Constraints

The examples above describe various memory system component (MSC) resource control parameters which can be used to control allocation of resources or management of contention for resources in a MSC. For example, the resource control parameters may include either the threshold capacity based control or portion-based control shown in the cache examples of FIGS. 9 to 11 described above, or could include the minimum or maximum bandwidth controls for memory bandwidth allocation as shown in the example of FIG. 2, or could include priority-based controls. As shown in the example of FIG. 9 above, the resource control parameters may be updated using memory accesses to certain memory mapped registers of the MSC. The memory map defined by the page tables used to control memory access by the MMU 70 may specify which software processes are allowed to access the memory addresses mapped to the configuration registers used to set the resource control parameters of a given MSC. For example, one approach could be that the resource control parameters for a software process in a particular operating state of the processing circuitry may be accessible by the highest-privilege-level software which is associated with that operating state. For example, resource control parameters associated with secure partition identifiers may be updatable by the highest-privilege-level code (or second highest-privilege) operating in the secure domain, such as the hypervisor or an operating system. Non-secure code may not be allowed to write to the memory mapped registers which control updating of the resource control parameters associated with the secure state. On the other hand, the highest-privilege (or second highest-privilege) code operating in the non-secure domain may be allowed to set the resource control parameters associated with non-secure partitions.

Hence, software in the secure domain may be able to reserve some portions of resource (such as a fraction of the cache capacity) for its exclusive use, by setting the resource control parameters associated with partition identifiers for secure software execution environments. For example, the secure software could set the cache partition bitmap as shown in FIG. 11 so as to leave at least one portion of the cache which is able to be allocated for that secure process, but for which the partition bitmaps for other processes specify that portion cannot be allocated to those other processes. In particular the secure software could set the partition bitmaps for non-secure partition IDs to leave that dedicated portion of the cache unallocated for those other partition IDs.

However, if non-secure software is also able to set the resource control parameters for the non-secure partition IDs, then that non-secure software could subsequently update the partition bitmap for one of those non-secure partition IDs to indicate that the dedicated portion of the cache reserved by the secure software can also be allocated for the non-secure software, effectively violating the dedicated use expected by the secure software.

A similar problem may exist where certain real-time software is granted exclusive access to certain resources, but the partition identifiers associated with other processes are then subsequently allocated access to the reserved portion by updating the memory system component resource control parameters for those other partition IDs, which can make it difficult for the real-time software to meet its service guarantees.

In the examples below, a memory system component (MSC) is provided with programmable constraint storage circuitry which stores at least one resource control parameter constraint which can be used to constrain updates that can be made to the resource control parameters used to manage allocation or contention for resources, or to constrain usage of the resource control parameters at the time of processing a memory transaction. Access to the resource control parameter constraint stored in the programmable constraint storage circuitry is restricted to a certain subset of operating states, e.g. the secure domain. This allows that subset of operating states to restrict what resource control parameters are allowed in other states, to reduce the chance that a previously set partitioning of resource is compromised by subsequent updates to the resource control parameters. This can be particularly useful for enforcing dedicated use of cache or bandwidth resource for certain secure or real-time software.

Figure 12:
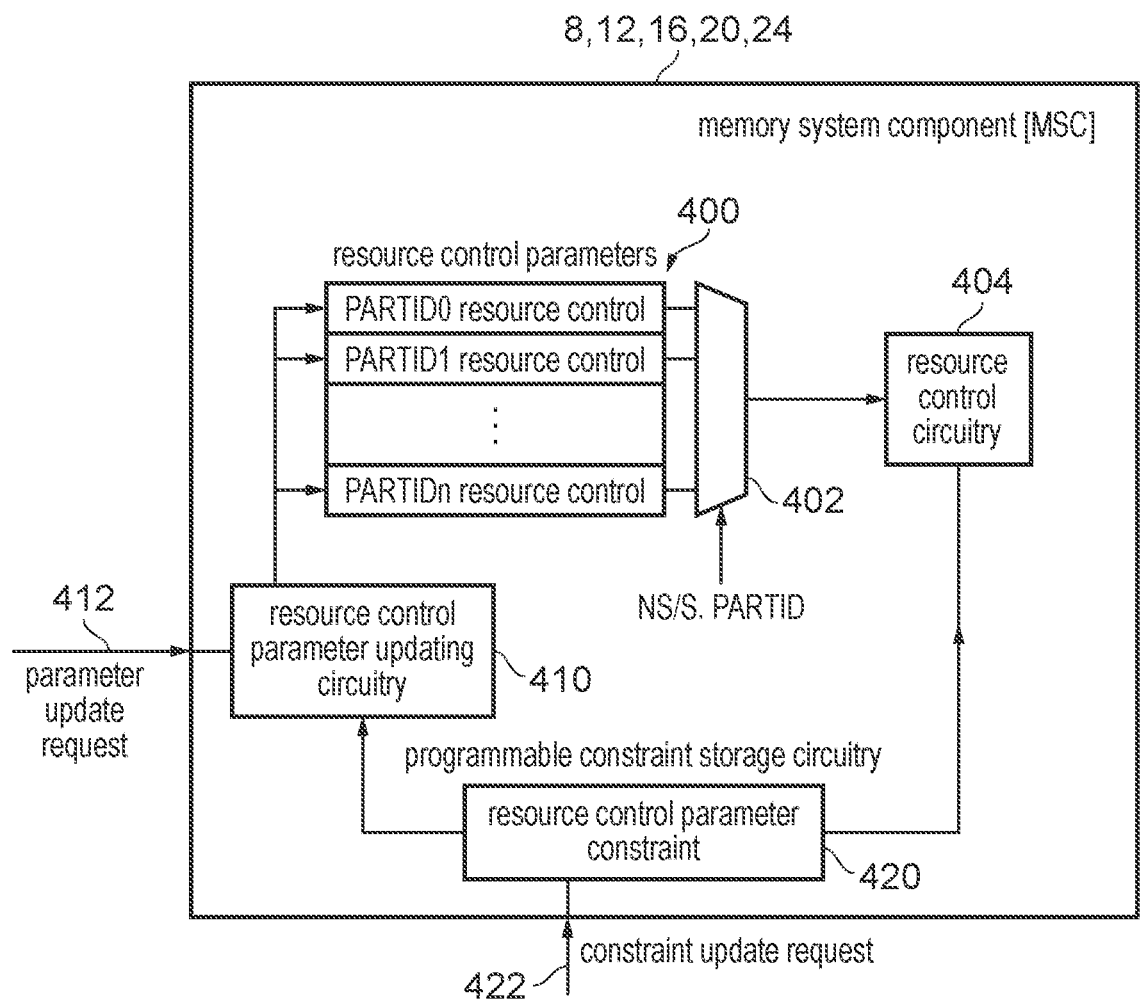
FIG. 12 shows an example of a memory system component having programmable constraint storage circuitry for storing at least one resource control parameter constraint.

FIG. 12 shows an example of a memory system component, which could be one of the caches 8, 12, 16, 20 or a memory controller 24 as in the examples above. For the cache example, it will be appreciated that while not shown in FIG. 12, the MSC of FIG. 12 could also include some of the components shown in FIG. 9, such as the cache storage 302, allocation count registers 326, memory mapped status and configuration registers 360 and performance monitoring storage 380, 382.

The MSC has a set of resource control parameter storage circuits 400 (e.g. registers) which store respective sets of resource control parameters for respective partition identifiers. A multiplexer 402 selects between the sets of control parameters based on the partition identifier (and security domain indicator) associated with a request for use of memory system resource. The partition identifier and security indicator are generated by the processing element issuing the request as discussed above. The selected set of resource control parameters are used by resource control circuitry 404 to control allocation of resource for handling the memory transaction associated with the specified partition identifier, or for managing contention to resources. The particular control performed by the resource control circuitry may vary depending on the type of memory system component, for example for caches the control may be which cache entries can be allocated for storing data associated with the memory transaction, while for a memory controller the control may be of whether bandwidth on a bus can be allocated to the transaction.

The MSC has resource control parameter updating circuitry 410 for controlling updating of the resource control parameters 400 in response to a parameter update request 412 received from a processing element. For example the parameter update request 412 may be a store memory transaction specifying as its target address a memory address which has been mapped to one of the resource control parameter registers 400. Alternatively, in examples which use memory mapped status or configuration registers 360 as in the example shown in FIG. 9, the parameter update request 412 may specify an address mapped to one of the configuration registers 360, and the updates made to these configuration registers 360 may then control the resource control parameter updating circuitry 410 to update the corresponding resource control parameter registers 400. This approach using configuration registers can help to reduce the number of addresses which need to be exposed to the memory map compared to the case where each respective resource control parameter register has its own memory mapped address. Hence, it will be appreciated that there are a number of ways in which the resource control parameters could be updated in response to a parameter update request.

When a parameter update request is received specifying a new value to be written to at least one target resource control parameter associated with at least one partition identifier, in some embodiments, the resource control parameter updating circuitry 410 controls whether that update of the target resource control parameter is allowed based on at least one resource control parameter constraint stored in programmable constraint storage circuitry 420. For example, the resource control parameter constraint could limit a minimum or maximum value able to be set for certain resource control parameters, or could specify whether certain portions of memory system resource are allowed to have their corresponding resource control parameters updated to indicate that portion of resource as being allowed to be allocated to any partition identifier. Hence, when updating a target resource control parameter in response to the parameter update request 412, the resource control parameter updating circuitry 410 considers whether that requested update would satisfy the constraints specified in the programmable constraint storage circuitry 420, and if the parameter update request would violate those constraints, then either the resource control parameter updating circuitry 410 could reject the request or the resource control parameter updating circuitry 410 could act upon the request only to the extent allowed by the constraint. For example, instead of setting a value which violates the constraint, the resource control parameter updating circuitry 410 could set a resource control parameter to a different value from the one requested, where the different value does satisfy the constraint.

Hence, in this way, the constraints can be used to ensure that once a certain set of resource control parameters have been established within the registers 400 of the MSC, then subsequent updates cannot update these parameters outside the bounds of the constraints defined in the programmable constraint storage circuitry 420. This provides better guarantees of expected resource partitioning for certain critical software such as secure software executing in the secure domain 90 or real-time-critical software which needs certain bounds on response latency for example.

Alternatively, instead of applying the constraints at the time of updating the resource control parameters, the constraints could be applied by the resource control circuitry 404 at the time of using the resource control parameters 400 to control processing of memory transactions. This is described further with respect to FIG. 18 below.

Regardless of whether the constraints are applied at the time of updating or usage of the resource control parameters, the programmable constraint storage circuitry 420 is programmable in response to a constraint update request 422 issued by the processing circuitry of a given processing element 6. For example, the programmable constraint storage circuitry 420 may comprise one or more memory-mapped registers within the MSC which can be updated by issuing a store memory transaction specifying as its target address a memory address mapped to one of those registers. The programmable constraint storage circuitry may be programmable in response to the constraint update request when that constraint update request 422 was issued by processing circuitry 6 when in one of a restricted subset of operating states (which excludes at least one operating state of the processing circuitry 6). Hence, programming of the programmable constraint storage circuitry may be prohibited in response to the constraint update request 422 if the constraint update request 42 was issued by the processing circuitry 6 when in an operating state other than one of these restricted subset of operating states. This ensures that any software execution environments which are allowed to set the resource control parameters 400 but are not one of the restricted subset of operating states are forced to abide by the constraints set by software executing in one of the restricted subset of operating states, which provide a stronger guarantee of the resource control parameter constraints enforced by the restricted subset of operating states.

For example, the processing circuitry may operate in one of the secure domain 90 and a less secure domain 92 as discussed above, and the restricted subset of operating states may comprise at least one operating state in which the processing circuitry operates in the secure domain. Hence, secure software may be able to set the resource control parameter constraint stored in the programmable constraint storage circuitry 420, but non-secure software in the less secure domain 92 may not be able to set the constraint. This means that the updates to the resource control parameters 400 performed by non-secure software are subjected to any constraints imposed by the secure software. This enables central control from the secure domain of any caps or limits on resource allocation imposed on non-secure software and limits the extent to which the non-secure software can vary the previously established resource control parameters 400 established by the secure software.

In one example, the enforcement that the constraint update request 422 can only be successful if it was issued from a restricted subset of operating states (such as the secure domain) can be done through control of the memory map defined in the page tables used by the memory management unit 70. For example the addresses mapped to the registers corresponding to the programmable constraint storage circuitry 420 may be defined in any page table structures as being accessible only to secure code and may be inaccessible to non-secure code. Also those addresses may also further the restricted in access based on privilege levels, so that only secure code associated with a given privilege level or higher can access the memory mapped registers for storing the resource control parameter constraint.

When the programmable constraint storage circuitry 420 is reprogrammed to update the resource control parameter constraint to a new value, it is possible that current values of some of the memory system component resource control parameters stored in registers 400 could breach the new value of the constraint set in the programmable constraint storage circuitry 420. In this case, there is no need to change the old values of the resource control parameters in registers 400, despite breaching the new constraint. It is preferred that the MSC retains the current value of any given MSC resource control parameter which breaches the new value of the constraint, regardless of the fact that it now is outside the bounds indicated by the resource control parameter constraints 420. This ensures that the secure software or other software which is able to set the constraints is allowed to first set certain resource-rich settings in the resource control parameters that might govern its own resource allocation or govern allocation for certain preferred software execution environments (such as real-time software), and then set the resource control parameter constraints 420 to less resource-rich thresholds so as to constrain any future updates to the resource control parameters in registers 400, while still retaining the previously set resource-rich controls. If the constraint-controlling software then later needs to add new resource-rich settings to the resource control parameters 400 which violate the current constraint value, then the constraint controlling software could temporarily loosen or remove (for at least a subset of partitions, such as secure partitions for example) the constraint defined in the programmable constraint storage circuitry 420, then add the new resource-rich resource control parameters to registers 400 and then restore the constraint in the programmable constraint storage circuitry 420 to prevent other software from programming resource control parameter settings that violate the constraints.

Figure 13:
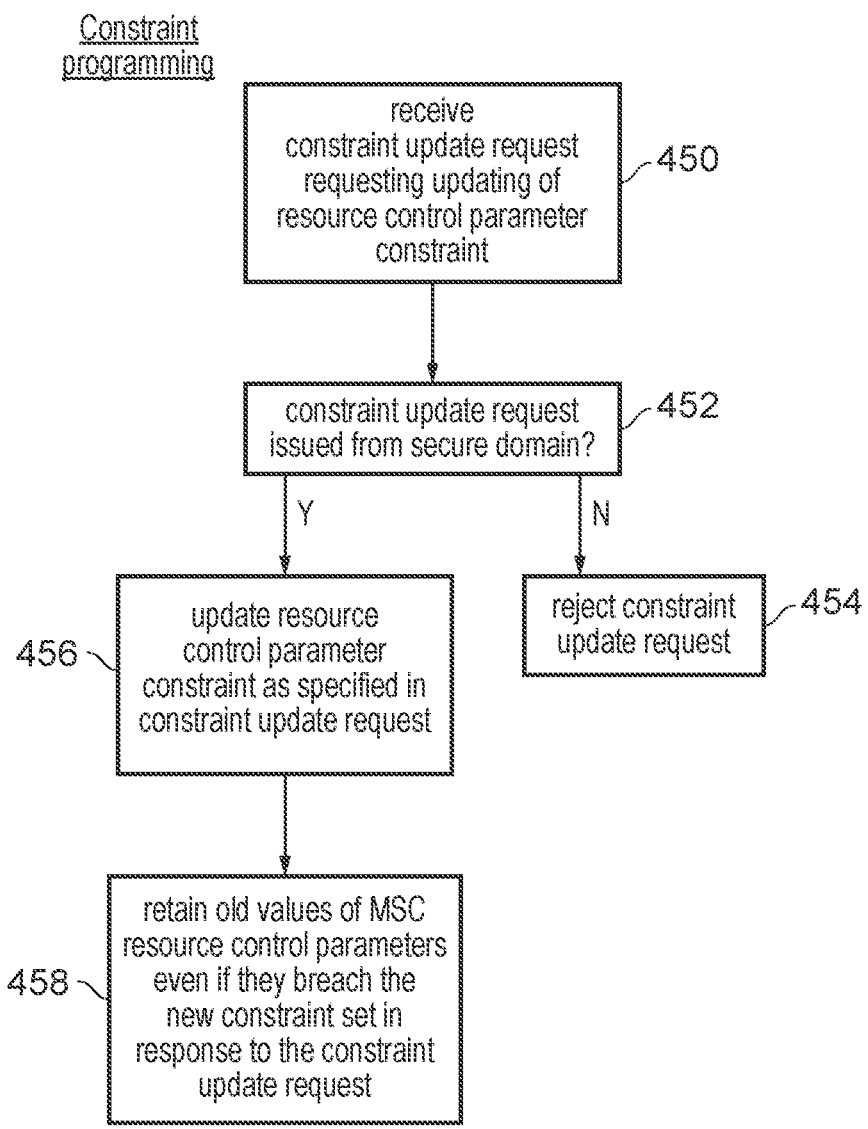
FIG. 13 is a flow diagram showing a method of programming the resource control parameter constraint.

FIG. 13 is a flow diagram showing a method of responding to a constraint update request 422 which requests updating of the resource control parameter constraint in the programmable constraint storage circuitry 420. At step 450 the constraint update request is received and at step 452 it is determined whether the constraint update request was issued from the secure domain or the less secure domain. In one example where the access to the programmable constraint storage circuitry 420 is controlled through the memory map used by the MMU 70, then steps 450 and 452 may effectively be performed by the MMU 70 rather than by the MSC which is to receive the constraint update request. An alternative would be that constraint update requests could be forwarded to the MSC regardless of checking of which domain the request was issued from, accompanied by an indicator showing the domain 90, 92 from which the request was issued, and then some circuitry at the MSC could check whether the constraint update request was issued from the secure domain. In this case, step 452 is performed at the MSC itself.

Hence, if at step 452 it is determined that the constraint update request was issued from the less secure domain 92, then at step 454 the constraint update request 42 is rejected. If the constraint update request was issued from the secure domain then at step 456 the constraint update request is acted upon by the MSC, which updates at least one resource control parameter constraint stored in the programmable constraint storage circuitry 420, to one or more new values as specified in the constraint update request. Following the update of the constraint, at step 458 any old values of the MSC resource control parameters 400 are retained even if they breach the new values for the constraints set in the programmable constraint storage circuitry 420 in response to the constraint update request. This ensures that any previously allocated resource-rich settings are retained even though future updates are restricted.

Figure 14:
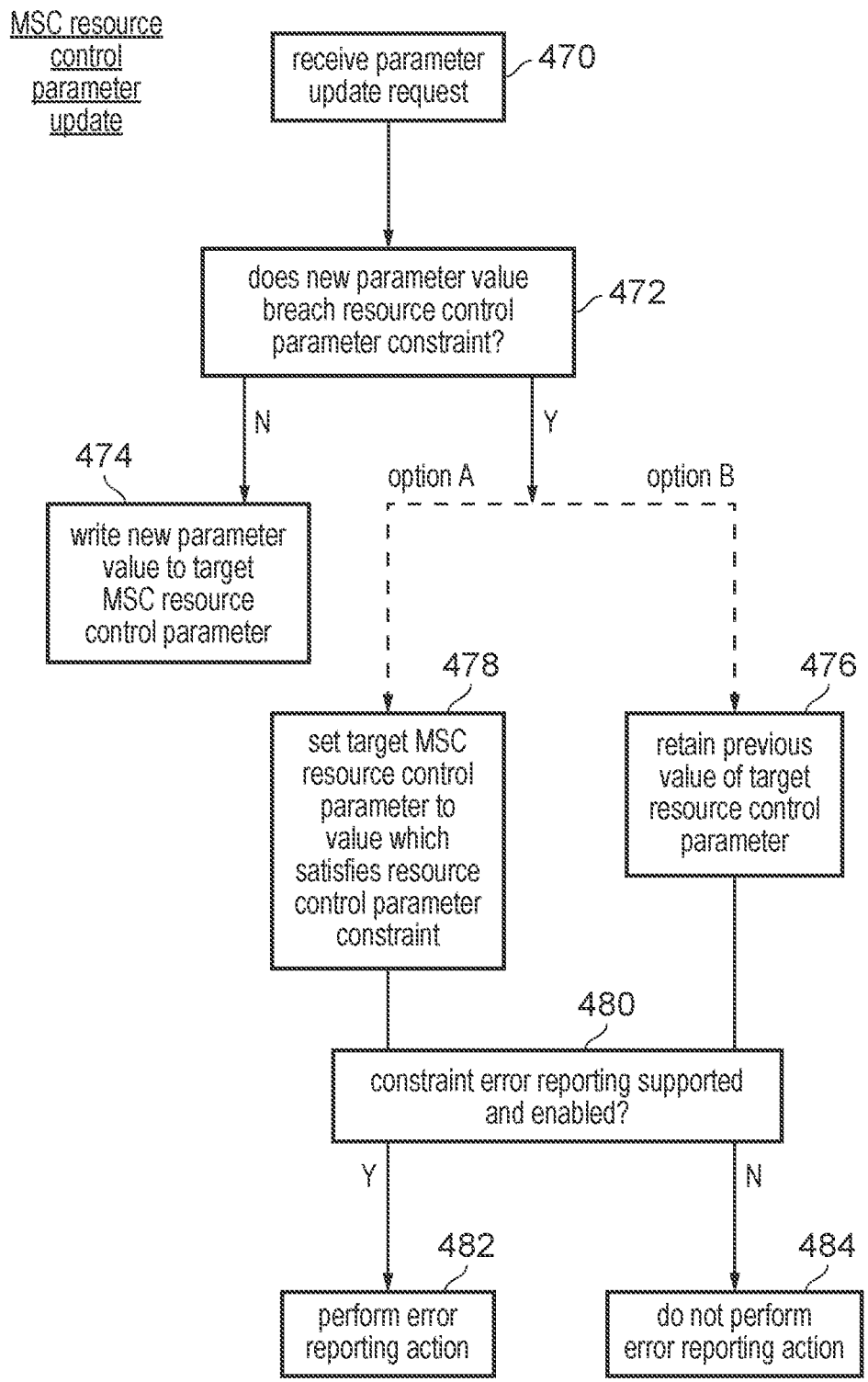
FIG. 14 is a flow diagram showing a method of controlling updates of memory system component resource control parameters based on the resource control parameter constraint.

FIG. 14 shows a flow diagram showing processing of a parameter update request 412 received at the MSC, requesting an update to the resource control parameters. In this embodiment, the resource control parameter constraint is used as a resource control parameter update constraint, which constrains the processing of the parameter update request. At step 470 the resource control parameter updating circuitry 410 receives a parameter update request 412, which could be a memory mapped store transaction for example as discussed above. The parameter update request specifies one or more new values to be written to one or more target resource control parameters associated with a given partition identifier. At step 472 the resource control parameter updating circuitry 410 checks whether the new parameter values specified breach any resource control parameter update constraint set in the programmable constraint storage circuitry 420. If not, then at step 474 the new parameter values can be written to the target resource control parameters within registers 400, so that new partition control settings are provided.

On the other hand, if at step 472 the new parameter value breaches any resource control parameter update constraint specified in the programmable constraint storage circuitry 420, then different options are available for responding to this event. In one option, at step 476 the parameter update request 412 can simply be rejected, so that any previous value of the target resource control parameter is retained, and the update requested by the parameter update request 412 is not made.

Alternatively, as shown in step 478 instead of simply rejecting the parameter update request, the parameter update request may be acted upon to the extent permitted by the resource control parameter update constraint. Hence, in response to the parameter update request 412, when the new value for the target memory system component resource control parameter breaches the resource control parameter update constraint, then the resource control parameter updating circuitry 410 of the MSC sets the target MSC resource control parameter to a value which satisfies the resource control parameter update constraint, instead of using the new value which breached the constraint. For example the resource control parameter updating circuitry 410 could attempt to set the target MSC resource control parameter to grant as much access to memory system resource as is permitted by the constraint. For example the target MSC resource control parameter could, instead of being set to the new parameter value specified in the parameter update request, be set to a value which matches the threshold defined in the resource control parameter update constraint. Hence, with this approach if a given software process requests that the parameters are updated to grant too much resource to a given partition identifier, then instead the MSC grants as much access to resource as is permitted within the bounds of the constraints set in the programmable constraint storage circuitry 420. This approach can improve performance (avoiding unnecessarily resource-poor settings for processes which could be granted more resource while still respecting the constraints enforced by certain constraint-controlling software such as the secure code).

Regardless of which of the options in steps 476 and 478 is taken, at step 480 the resource control parameter updating circuitry 410 may determine whether constraint error reporting is supported and enabled for this particular MSC. If constraint error is supported and enabled, then at step 482 an error reporting action is performed. This error reporting action could be at least one of: recording error reporting information in an error reporting storage element and/or signalling an interrupt. On the other hand, if error reporting is not supported, or is not currently enabled in an implementation which does support error reporting, then at step 484 the error reporting action is not performed.

In general, it can be useful for software to be made aware if a parameter update request has not fully been acted upon due to it specifying a new parameter value which breached the parameter update constraint. This can be useful for debugging purposes so that if software is not behaving as expected, for example because the software is getting less access to memory system resource than anticipated, then the reason for this can be identified. This can help with code development.

Some hardware implementations may not support error reporting at all, and in that case then when a new parameter value for a parameter update request breaches the parameter update constraint, no error reporting action may be performed, and so the method always proceeds to step 484 for such implementations.

However, for other implementations which do support error reporting, this can be useful to improve debugging ability so that software can receive notice if a request resource control parameter update has been downgraded due to the constraints set in the programmable constraint storage circuitry. Some such implementations which do support error reporting may permanently enable the error reporting, so that the method always proceeds to step 482 and step 484 is never performed.

However, in other implementations which do provide hardware support for error reporting, whether or not the error reporting is enabled or disabled may depend on programmable configuration information stored in a configuration storage element. For example the configuration storage element could be another memory mapped register of the MSC which stores a parameter enabling or disabling the error reporting. In some cases the configuration could simply be of whether or not the error reporting is performed at all. In other examples the configuration information could also specify more detailed properties of error reporting, such as defining the particular error reporting actions to be taken (for example it could be configurable whether an interrupt is signalled when the error reporting action is performed, or whether the error is simply recorded in an error reporting storage element without signalling an interrupt). Another error reporting configuration option could be to report occurrences of some types of errors and not to report occurrences of other types of errors. Hence, constraint errors may be configurable to be reported or not to be reported.

Figure 15:
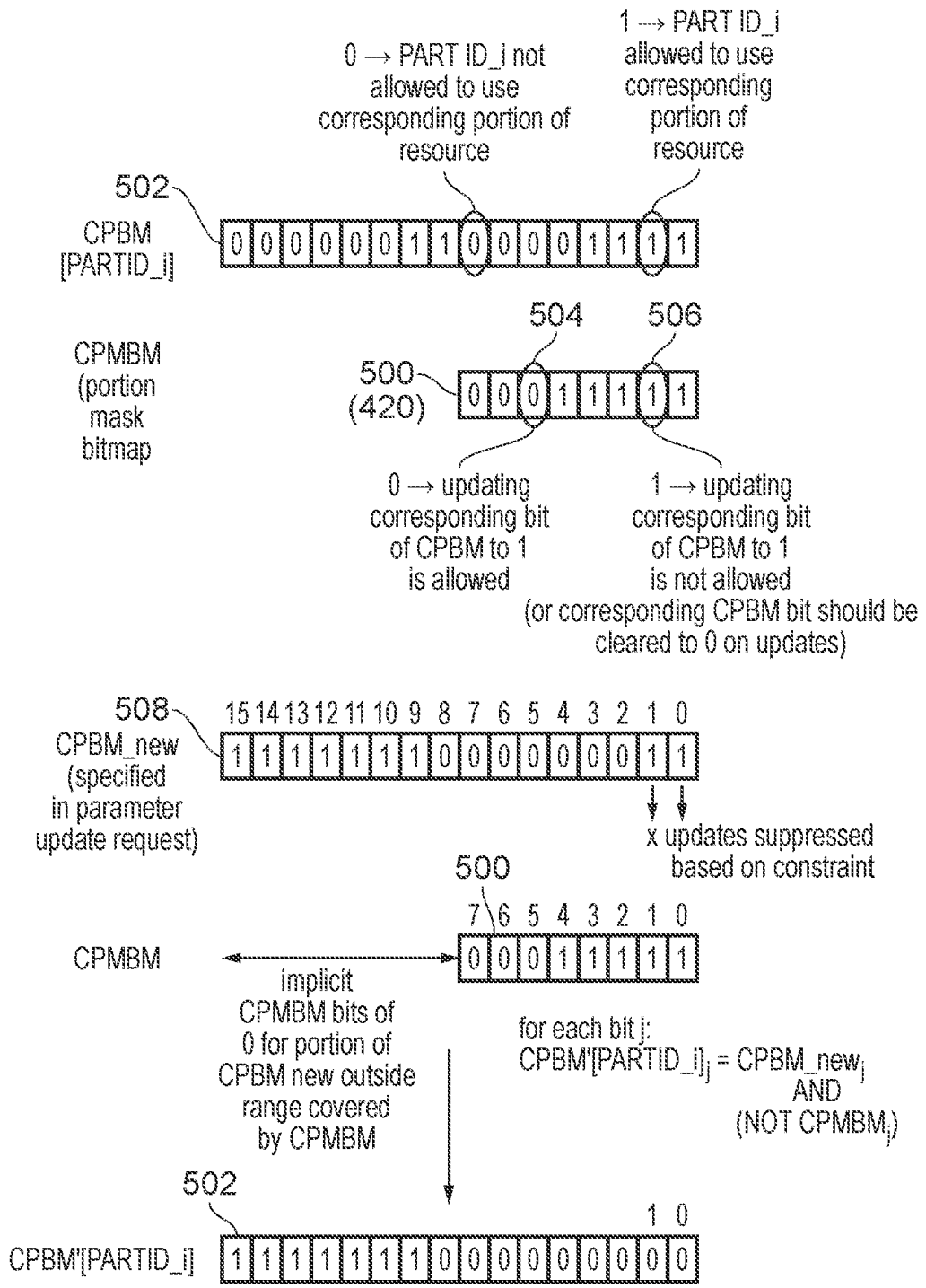
FIG. 15 shows an example of a resource control parameter update constraint for a portion-based resource allocation control parameter.
Figure 16:
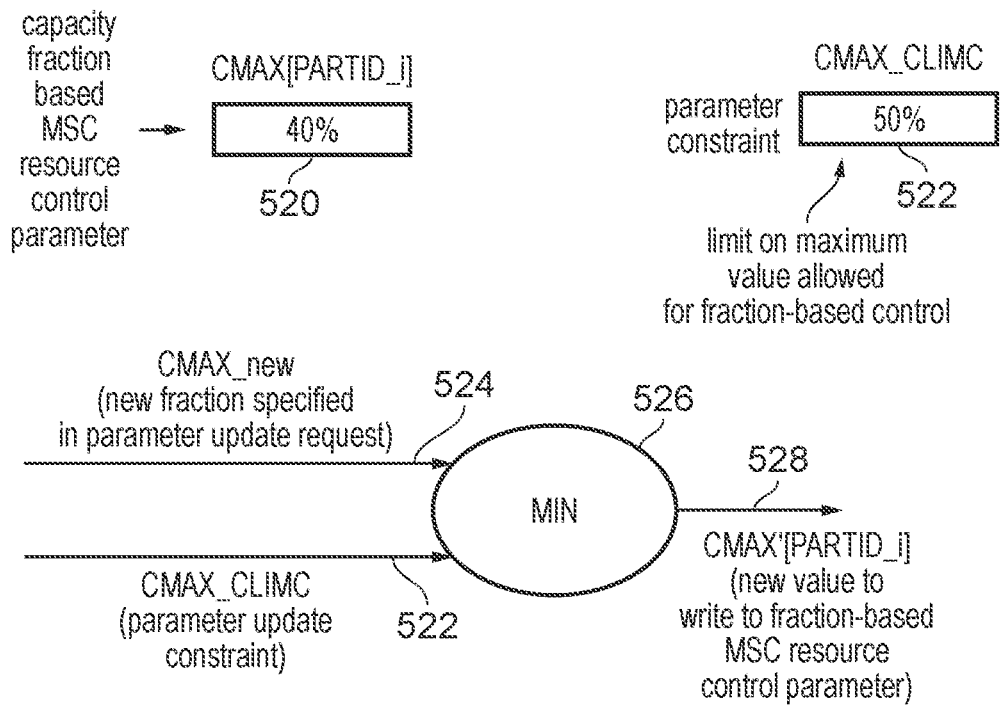
FIG. 16 shows an example of a resource control parameter update constraint set for a fraction-based capacity threshold provided as an example of a memory system component resource control parameter.
Figure 17:
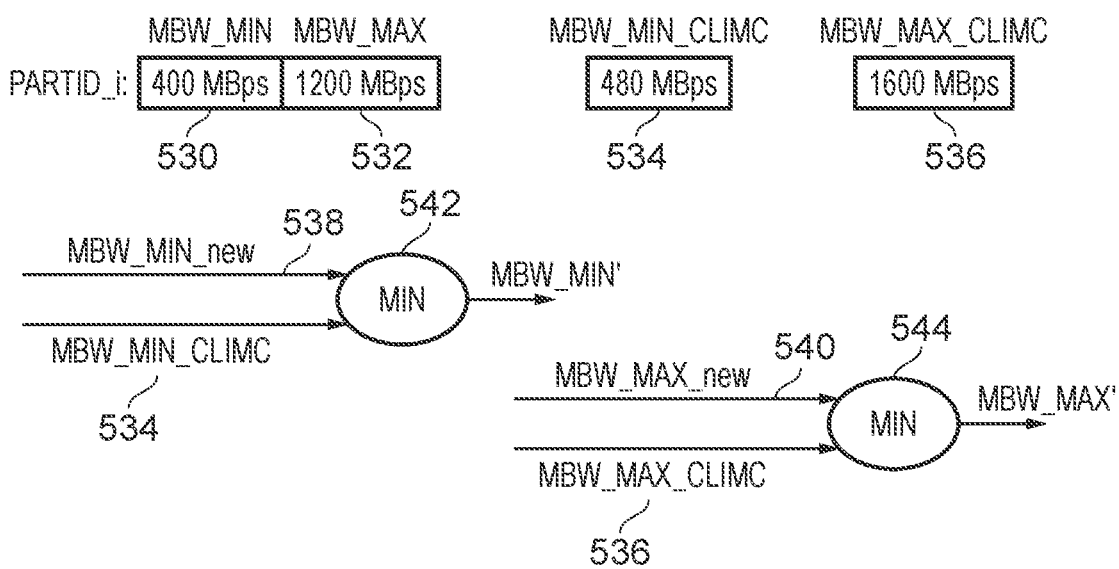
FIG. 17 shows an example of applying constraints on minimum and maximum bandwidth thresholds.

The examples of FIGS. 12 to 14 discuss resource control parameter constraints in general terms. FIGS. 15 to 17 show examples of more specific types of constraints that may be imposed on corresponding types of MSC resource control parameters.

FIG. 15 shows an example of constraining updates to resource control parameters which use a portion bitmap as in the example of FIG. 11 discussed above. For example, FIG. 15 shows a cache portion bitmap (CPBM) 502 for one partition ID, which can be used to control allocation into a cache for requests associated with that partition ID, where the bitmap comprises a number of bits each corresponding to a certain portion of the cache capacity. When a given bit has a value of 0 this indicates that the software for the corresponding partition ID is not allowed to allocate data to the corresponding portion of the cache, while when the bit has a value of 1 then the software for the corresponding partition ID is allowed to allocate data to the corresponding portion of the cache. While FIG. 15 shows an example of controlling cache allocation based on such a portion bitmap, it would also be possible to provide portion-based resource allocation control parameters for other types of memory system components. For example, portion-based control could be imposed on memory bandwidth allocation by providing a number of independent types of bus credits and using a portion-based bitmap to indicate which types of bus credits are allowed to be used by particular partition identifiers. Hence, more generally a portion-based resource allocation control parameter may be provided which specifies, for each of two or more portions of resource, whether that portion of resource is allowed to be allocated for use by a software execution environment associated with a corresponding partition identifier.

As shown in FIG. 15, when a portion-based resource allocation control parameter is used then the resource control parameter update constraint may also be defined as a bitmap 500 which acts as a mask, masking updates to at least a subset of the resource control bitmap 502 specified as the portion-based resource allocation control parameter. The mask bitmap (CPMBM) 500 functions as a portion-based constraint which specifies, for each of a subset of portions among the portions of resource having corresponding bits in the portion bitmap 502, whether any of the portion-based resource allocation control parameters 502 for any partition ID is allowed to be updated to indicate that particular portion as being allowed to be allocated for use. For example, in the encoding shown in FIG. 15, if a given bit 504 of the portion mask bitmap 500 is 0 then the corresponding bit of the portion bitmap 502 is allowed to be set to 1 to indicate that a corresponding partition ID is allowed to use that corresponding portion of the cache or memory resource. On the other hand, when a given bit 506 of the portion mask bitmap 500 has a value of 1, this may indicate that it is not allowed to set the corresponding bit to 1. Note that the mask bitmap 500 is shared between all the portion bitmaps 502 associated with all the partition identifiers (FIG. 15 only shows the portion bitmap 502 for one partition ID, but other partition IDs would each have their own portion bitmap), so that each portion bitmap is subject to the same update constraints defined in the portion mask bitmap 500.

Hence, the portion mask bitmap 500 functions as a portion-based constraint which constrains what updates can be made to the portion-based resource allocation control parameter 502, to limit the resource that can be requested in later requests. This means that once secure domain software has allocated itself or a particular other software execution environment with dedicated use to a certain portion of memory system component resource, and has set the control parameters for another partition identifier to exclude that other partition from using the reserved dedicated resource, then by setting the constraints in the portion mask bitmap 500 with bits equal to 1 in the locations corresponding to the reserved portion, this will prevent any other control software from subsequently updating the resource control bitmap 502 for any partition ID to change the bits corresponding to the reserved portions from 0 to 1.

In one example implementation when an update of the portion bitmap 502 is attempted for which a given bit of the portion bitmap 502 is attempted to be set to 1, but the corresponding bit of the portion mask bitmap 500 specifies that this is prohibited, then the given bit of the portion bitmap 502 retains its previous value (so if previously set to 0, it would remain at 0 despite the corresponding bit of the new portion bitmap value 508 being 1, but if the given bit of the portion bitmap was 1 prior to the update then it could retain its value of 1 after the update). However, this behaviour is not essential.

A second approach could be that, on updating the portion bitmap 502, any "masked out" bits of the portion bitmap 502 (which correspond to '1' bits 506 of the portion mask bitmap 500 indicating that setting the corresponding bit of the portion bitmap 502 to 1 is prohibited) are cleared to 0 regardless of their previous state. In other words, the mask bitmap 500 is applied when an update is applied to the portion bitmap 502, and any "not permitted bits" 506 in the mask bitmap 500 force the corresponding "masked out" bit in the portion bitmap 502 to be cleared (to indicate that requests with the corresponding partition ID may not be allocated that portion of the resource). Therefore, the previous value of the "masked out" bits of the portion bitmap 502 do not matter if this approach is taken. This may be useful because it may be that the relevant entry in the control settings table is being updated because the corresponding PARTID has been recycled to a new software environment, so it may be preferred to ensure that any previously allocated settings for a previous software environment are cleared if they breach the constraints defined in the portion mask bitmap 500. Hence, with this embodiment, a "masked" bit identified by the portion mask bitmap 502 indicates that no new value 508 for the portion bitmap 500 can permit a partition ID to allocate that portion of resource, so that after any subsequent write to the portion bitmap 500 for a partition ID, the corresponding bit of the newly written portion bitmap 500 should indicate that allocation of that portion of resource is not allowed (e.g. in this embodiment that bit should be 0).

In this second approach, this constraint on the updating of the portion bitmap 502 can be enforced by combining a new bitmap value 508 specified in a parameter update request and the constraint portion mask bitmap 500 such that the new value is bit-wise ANDed with the result of inverting the corresponding bits of the portion mask bitmap 500. In other words, CPBM'[PARTID$_i$]$_j$=CPBMnew$_j$ AND (NOT (CPMBM$_j$)), where CPBM'[PARTID$_i$]$_j$ is the new value set for bit j of the portion bitmap 500 for partition ID i following the requested update, CPBMnew$_j$ is bit j of the new value 508 requested to be written to the portion bitmap 500 for partition ID i, and CPMBM$_j$ is the value of bit j of the constraint portion mask bitmap 502. This approach means that any bits in the new bitmap value 508 which correspond to bits of 1 in the portion mask bitmap 500 are cleared to 0. For example, in the particular instance shown in FIG. 15 the new portion bitmap value 508 specified in the parameter update request requested that the bitmap 502 was updated to indicate that resource portions 0 and 1 were able to be allocated to the corresponding partition identifier, but as bits 0 and 1 in the portion mask bitmap 500 are set to 1, this constrains the update and clears bits 0 and 1 of the corresponding partition's portion bitmap 502 to 0 instead.

Note that it is not essential for the portion mask bitmap 500 to have the same number of bits as the portion bitmap 502. In practice, it is unlikely that software controlling the constraint storage circuitry 420 would impose constraints so as to prevent the entire portion bitmap 502 being changed from 0 to 1, as there will typically be a need for other software execution environments to be allocated at least some resource in the cache or the memory component. In practice there is a hardware cost to implementing the storage for the portion mask bitmap 500 within the programmable constraint storage circuitry 420 and also for implementing the logic for combining the respective bits of the portion mask bitmap 500 with the new value 508 for the portion bitmap. To limit this hardware cost, there may be a limit on the number of portions which can be constrained by the portion mask bitmap, and so for any bits of the portion bitmap 502 which extend outside the range covered by the portion mask bitmap 500, the portion mask bits for those portions may be implicitly assumed to be equal to 0, so that updates for those portions of memory system component resource are unconstrained. That is, the portion mask bitmap (portion-based constraint) may effectively constrain only updates to a certain subset of portions of resource, and that subset may exclude at least one portion of resource, which can be more efficient in terms of hardware. In this case, then if secure software controlling the constraints wishes to reserve certain portions of resource for its own use, or for use by a specified other software execution environment, then it may be forced to select as the reserved portions of resource one of the portions which corresponds to the explicitly stored bits in the portion mask bitmap 500.

Hence, in summary where the memory system component resource control parameters include a portion-based resource allocation control parameter, specifying for each of two or more portions of resource whether that portion is allowed to be allocated for use by a software execution environment associated with a corresponding partition identifier, then the constraint may comprise a portion-based constraint which specifies for each of a subset of the portions whether the corresponding portion-based resource allocation control parameter is allowed to be updated to indicate that portion as being allowed to be allocated. If a parameter update request requests that the portion-based resource allocation control parameter is to be updated to indicate that a given portion of resource is allowed to be allocated and the portion-based constraint specifies that the given portion is prohibited from being updated to indicate the given portion as being allowed to be allocated, then instead the portion-based resource allocation control parameter may be set to indicate that the given portion of resource is prohibited from being allocated. An example of this is shown at the bottom of FIG. 15 where the requested updates to set bits 0 and 1 of portion bitmap 502 equal to 1 is rejected and instead these bits are set equal to 0 in the new value written to portion bitmap 502, because bits 0 and 1 of the portion mask bitmap 500 were set to 1 to indicate that the 0 to 1 transition of the portion-based constraint was prohibited for those portions 0 and 1 of the resource available.

It will be appreciated that the particular encoding shown in FIG. 15 is not essential. For example, other implementations could reverse the meaning of 0 and 1 in one or both of the portion bitmap 502 and the portion mask bitmap 500.

As shown in FIG. 16, as discussed above other MSCs may define a fraction based resource control parameter which sets a limit on the maximum fraction of resource which is allowed to be allocated to the software associated with the corresponding partition identifier. For example, FIG. 16 shows an example where the maximum fraction of cache allocation for a given partition identifier is defined by a cache allocation threshold value 520, which in this example is set to 40% of the cache capacity. Where a capacity fraction limit is imposed in the MSC resource control parameters, then the corresponding parameter update constraint can be a further fraction 522 which sets a limit on the maximum fraction which is allowed to be specified in the fraction control 520. Again, the constraint 522 can be shared among the respective fraction control parameters 520 for each of the partition IDs (FIG. 16 only shows the fraction control parameter 520 for a single partition ID for conciseness). For example, in FIG. 16 the maximum fraction able to be set in the resource control parameter 520 is set in the constraint storage 522 as being 50%. Hence, attempts to update the resource control parameter 520 to allocate any partition with more than 50% of the storage may be rejected, or only partially acted upon to the extent permitted within the cap set in the programmable constraint 522. With this approach, then when a new value 524 is specified by a parameter update request 412 to be written to the fraction based control 520, that new value 524 may be combined with the limit specified in the parameter update constraint 522 by minimum determining circuitry 526, which outputs the minimum of the values 522, 524, and the resulting minimum value 528 is then written to the capacity threshold fraction value 520 for the corresponding partition identifier. Hence, if the requested new value 524 was less than or equal to the limit specified in the parameter update constraint 522 then the new value is simply written to the relevant resource control parameter 520, but if the new value exceeds the limit then instead the limit value will be written, so that the corresponding partition is not allocated any more resource than is permitted by the constraint.

As shown in FIG. 17, in examples which have a memory controller or other memory system component which imposes minimum and maximum bandwidth thresholds 530, 532 as discussed above, corresponding minimum and maximum constraint limits 534, 536 may be provided within the programmable constraint circuitry 420 which limit the maximum value able to be written to each of the minimum and maximum bandwidth values 530, 532 respectively. Again a single instance of a minimum threshold limit 534 or maximum threshold limit 536 may be shared among the bandwidth controls 530, 532 for all partition IDs. Similar to FIG. 16, the constraint value 534, 536 is combined with a new value 538, 540 to be written to one of the minimum and maximum bandwidth limits 530, 532 using minimum determining circuitry 542, 544, so that the value written to the resource control parameters 530, 532 for the minimum and maximum bandwidth values is capped at the level specified in the corresponding constraint values 534, 536, for both minimum and maximum bandwidth. Hence, by capping updates to the maximum bandwidth to a certain level this prevents a given partition being allocated more than the share of memory bandwidth permitted by the constraint controlling software such as the secure domain code. Also, by preventing the minimum bandwidth being set above a certain threshold level this ensures that there is a limit to the extent to which memory transactions can have their priority boosted when an allocated bandwidth is less that the minimum threshold.

Hence the examples of FIGS. 16 and 17 are examples where the set of memory system component resource control parameters includes a resource allocation threshold parameter indicating either a maximum or a minimum threshold for controlling allocation of resource for use by a software execution environment associated with the corresponding partition identifier, or for controlling management of contention for resource. This resource allocation threshold parameter could be a maximum threshold, with further allocation of resource being prevented if it would result in the corresponding software execution environment being allocated an amount of resource greater than the maximum threshold (as in the examples 520, 532 shown in FIGS. 16 and 17). Alternatively the resource allocation threshold parameter could indicate a minimum threshold, as in the example 530 shown in FIG. 17, such that when a current fraction or amount of resource allocated to the corresponding software execution environment is less than the minimum threshold indicated by the resource allocation threshold parameter then priority of requests issued by the corresponding software execution environment can be boosted.

Either way, regardless of whether the threshold is a minimum or a maximum, the resource control parameter update constraint may specify a threshold cap constraint (such as the examples 522, 534, 536 shown in FIGS. 16 and 17) which specifies a threshold cap value. If a parameter update request requests an update of the resource allocation threshold parameter 520, 530, 532, the memory system component may prohibit the resource allocation threshold parameter 520, 530, 532 being updated to indicate as either the maximum or minimum threshold, a threshold greater than the threshold cap value indicated by the threshold cap constraint 522, 534, 536. More particularly, when updating the resource allocation threshold parameter, the memory system component may set the resource allocation threshold parameter to indicate a minimum of the new threshold 524, 538, 540 specified by a parameter update request and the threshold cap value 522, 534, 536 indicated by the threshold cap constraint.

It will be appreciated that while FIGS. 15 to 17 show some examples of types of MSC resource control parameters and corresponding examples of constraints that can be set to contain updates to those parameters, these are not the only examples that could be provided. In another example a proportional stride resource could be defined. A proportional stride resource control has a stride minus 1 parameter (STRIDEM1). STRIDEM1 is represented as a non-negative integer. The STRIDEM1 value of 0 gets the most access to the resource. A STRIDEM1 value of 1 gets half as much access to the resource, a STRIDEM1 value of 3 gets a quarter as much access to the resource, and so on. The constraint on a proportional stride resource control is also a non-negative integer. When a new value of STRIDEM1 is written for a PARTID, the value stored in the control setting storage is the maximum of the new value and the constraint.

When the processing system is reset (for example on power up, or when a reset signal indicating that the apparatus is to be reset to some known predetermined state is received), then the contents of the programmable constraint storage circuity 420 may be reset to values which indicate that updating of the respective sets and memory system component resource control parameters 400 is unconstrained. Hence, this can allow system firmware executing just after power up or reset to set the respective sets of resource control parameters 400 without any restriction, so that any dedicated access to certain portions of resource can be enforced, before setting the constraints 420 which then protect those resource control settings from subsequent updates by other software.

Alternatively, in some implementations then there may be no hardware circuitry which enforces the resetting of constraints to values indicating unconstrained updates to the MSC resource control parameters. In that case, after reset it may be the responsibility of firmware or other platform software executing on the device to set up the device accordingly by setting the constraint register 420 to permit unconstrained updates to the resource control parameters until the point at which any carve out of dedicated resource has been enforced, and then subsequently to set the constraints in the programmable constraint storage circuitry 420 to supress subsequent updates.

Hence, in one possible usage of the programmable constraint storage circuitry, after a reset firmware that sets up the device may set the constraint registers 420 so that they do no constrain control settings in the resource control parameters 400 at all. For example for the portion-based bitmap of FIG. 15 this could be that all the bits of the portion mask bitmap 500 may be set to 0. For the fraction based threshold control in the example of FIG. 16 then this could be that the limit value specified in the constraint register 522 is set to its maximum permitted value, and similarly for the example of FIG. 17 the constraint registers 534, 536 limiting the minimum and maximum bandwidth parameters could be set to the maximum constraint values permitted. If the system firmware then needs to carve out some resources for dedicated use from early in the boot process, it can then set the appropriate resource control parameters 400 to grant itself or certain other partitions exclusive access to certain portions of memory system resource or to grant itself or the other process a relatively high fraction of resource, depending on the control type. Having set up the resource control parameters as needed, the system firmware can then set the constraints to reduce the flexibility for subsequent updates for control parameters, such as by setting some bits equal to 1 in the portion mask bitmap 500 of FIG. 15 or reducing the thresholds defined in the parameter update constraint registers 522, 534, 536 as in the examples of FIGS. 16 and 17.

Once the system is in normal operation, subsequent updates to constraints could be limited to a certain piece of control software, for example a potentially small piece of software executing in the secure domain which acts as the controller of constraints. The constraint controller may receive constraint update requests from secure and non-secure software and decide whether to grant or reject them. This software could then alter the contents of the constraint registers 420 in particular memory system components as needed to enforce the constraints.

In another example, multiple constraints could be set for a given resource, each constraint controlled by a different controller and applying only to accesses from lower privilege environments. For example, in a system with Secure/Non-secure domains, the secure controller's constraints could apply to lower privilege levels in the Secure domain and all privilege levels in the Non-secure domain. A Non-secure controller could specify constraints which apply to lower privileges in the Non-secure environment but which do not apply to the Secure environment.

While a number of different types of constraints corresponding to different types of resource control parameters are discussed above, it will be appreciated that any one platform implementation may not use all of these examples, depending on the particular memory system components and resource partitioning controls included. Also, some implementations may have some memory system components that use one type of constraint and other memory system components which use another type (depending on the type of resource partitioning control implemented at each memory system component).

Figure 18:
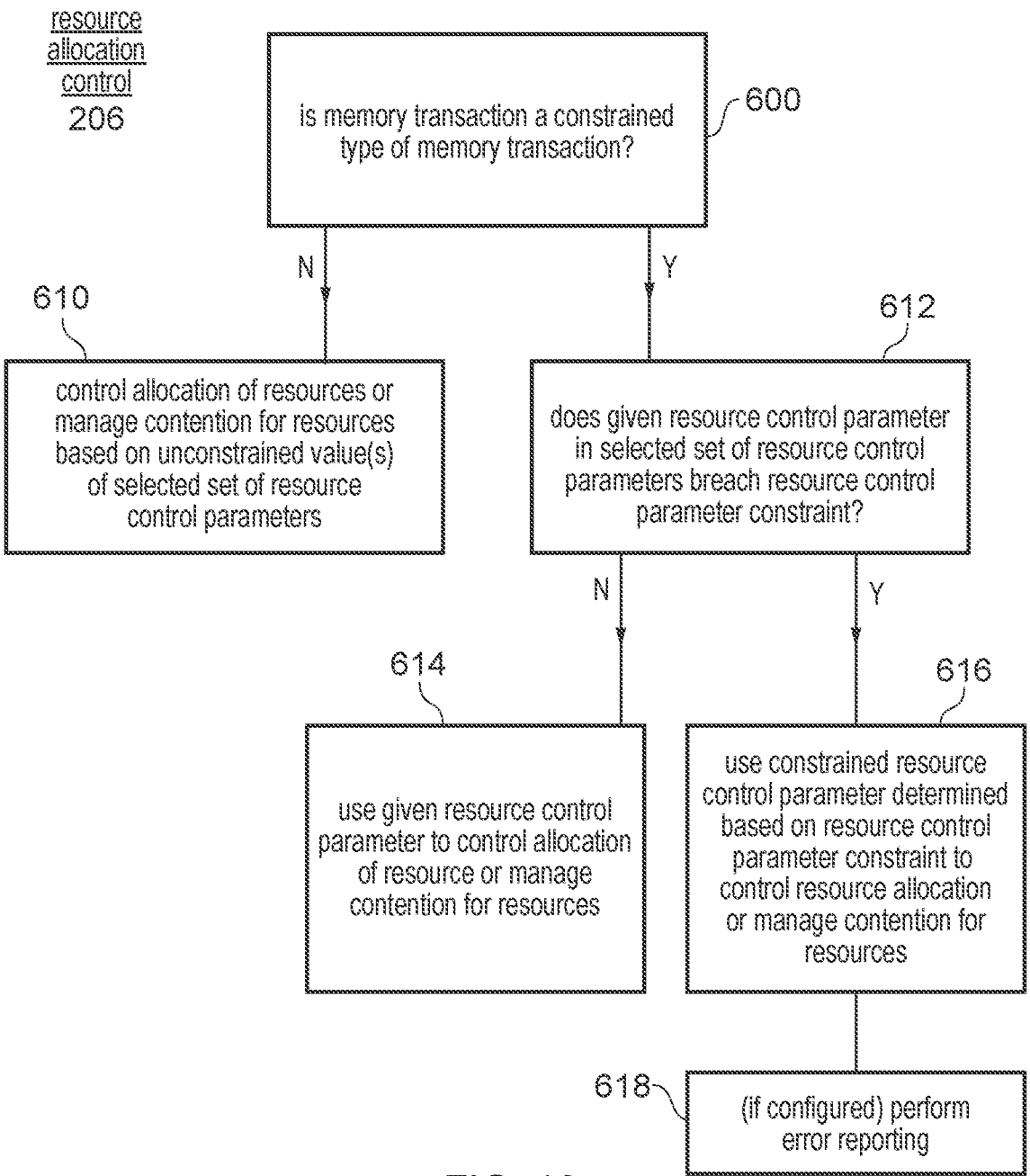
FIG. 18 is a flow diagram illustrating a method in which the resource control parameter constraint is applied at the time of using the resource control parameter to control resource allocation or contention management for a memory transaction.

The examples of FIGS. 14-17 above describe constraints which are applied at the point of updating a resource control parameter for a given partition identifier. As shown in FIG. 18, an alternative approach is to allow unconstrained setting of resource control parameters, but to use the constraints defined in the programmable constraint storage circuitry 420 to constrain usage of the resource control parameters at the time of processing memory transactions. For example, if a memory transaction is to be controlled based on a given resource control parameter and a constraint has been defined imposing a limit on that given resource control parameter, then even if the stored value of the given resource control parameter breaches the limit defined by the constraint, the given resource control parameter may be interpreted as having a constrained value within the limit defined by the constraint, and that constrained value can be used to control allocation of resources or manage contention between resources, instead of the value actually stored for the given resource control parameter.

Hence, in the example of FIG. 18 the resource control parameter constraint may be defined in a similar way to the examples of FIGS. 14-17 (e.g. using a portion mask bitmap 500 or a threshold cap value 522, 534, 536), but the constraint may be interpreted as a resource control parameter usage constraint instead of a resource control parameter update constraint.

FIG. 18 shows in more detail steps performed when using the resource control parameters to control allocation of resources or manage contention for resources at step 206 of FIG. 8, in one embodiment. At step 600, the memory system component determines whether the memory transaction being processed is a constrained type of memory transaction that is to be subject to any constraints defined in the programmable constraint storage circuitry.

Figure 19:
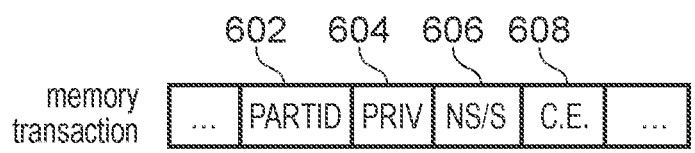
FIG. 19 illustrates an example of identifiers specified by a memory transaction which can be used to determine whether the transaction is to be subject to constraints on resource control parameters.

As shown in FIG. 19, in addition to the partition identifier 602, the memory transaction could specify one or more identifiers, such as a privilege level identifier 604 indicating a level of privilege associated with the memory transaction, a security domain identifier 606 indicating a security domain associated with the memory transaction, and/or a constraint exemption identifier 608 indicating whether the memory transaction is exempt from being constrained based on the corresponding resource control parameter constraint. It will be appreciated these are just some examples and it is not essential to use all of these identifiers. In one example, the memory system component may determine whether a memory transaction is the constrained type of memory transaction based on at least one of the identifiers 602, 604, 606, 608 specified by the memory transaction. For example, some specific PARTIDs may be exempted from constraint, while other PARTIDs may be subject to constraints. Also, the determination of whether to apply the constraints could be based on whether the memory transaction was issued from the secure or non-secure domain (e.g. secure transactions may be unconstrained, but less secure transactions may be constrained). Another approach can be that memory transactions issued from privilege levels below a certain threshold could be constrained, but more privileged processes may have their memory transactions unconstrained. Also, the constraint exemption identifier 608 may allow some software processes to individually identify particular transactions as being exempt from constraints while other transactions from the same software process could be subject to constraints. In some examples, the constraint exemption identifier 608 may be used in combination with one of the other identifiers 602, 604, 606 so that only certain software processes (e.g. secure processes, or processes having privilege greater than a threshold) are allowed to selectively exempt their transactions from constraint, while other software processes may have all their transactions constrained regardless of the value of the constraint exemption identifier 608.

There are a large number of options which could be implemented. In some implementations, the determination of whether a memory transaction is constrained or non-constrained may depend on programmable configuration data stored in a control register. For example, a privileged process could program the configuration data to specify the PARTIDs, privilege levels or security domain for which constraints should or should not be applied, or set a "mode" indicator indicating the particular mode for determining whether a memory transaction is constrained or not (e.g. one mode could determine whether the transaction should be constrained based on PARTID, another mode could determine whether the transaction should be constrained based on privilege level, while other modes could use a combination of identifiers such as exemption identifier 608 in combination with privilege level 604).

Hence, regardless of the precise mechanism used to distinguish constrained and non-constrained types of memory transactions, at step 600 a determination is made whether the particular memory transaction being processed is the constrained type of memory transaction. By providing a mechanism for some memory transactions to be exempted from the constraints, this allows some preferred processes (such as secure domain processes or real-time-critical processes) to use relatively resource-rich settings while others are constrained to use settings within certain bounds.

If the memory transaction is not the constrained type of memory transaction, then at step 610 the allocation of resources or management of contention for resources for the transaction is controlled based on the unconstrained value of the selected set of resource control parameters stored in the settings table 106.

If the memory transaction is the constrained type of memory transaction, then at step 612 it is determined whether a given resource control parameter in the selected set of resource control parameters breaches the resource control parameter constraint stored in the programmable constraint storage circuitry 420. If the given resource control parameter does not breach the constraint, then at step 614 the given resource control parameter can be used (unmodified) to control allocation of resource or manage contention for resources. If the given resource control parameter does breach the constraint, then at step 616 a constrained value of the resource control parameter, which is determined based on the resource control parameter constraint and is less permissive in terms of permitting resource to be allocated than the stored value of the resource control parameter, may be used to control resource allocation or manage contention for resources. For example, for a threshold-based resource control parameter, the constrained resource control parameter used at step 616 could be the threshold cap specified by the constraint. For a portion-based resource control parameter, the constrained resource control parameter used at step 616 may be a modified bitmap where any bits which are indicated as masked out by the corresponding portion masking bitmap are assumed to be clear so that the corresponding portion of resource cannot be allocated to the memory transaction. At step 618, if error reporting is both supported by the hardware and enabled (if configuration of whether error reporting is enabled or disabled is supported, this decision depends on the configuration settings), then an error reporting action is taken (e.g. recording error reporting information and/or signalling an interrupt), as at step 482 of FIG. 14.

FIG. 18 shows a logical flow at steps 612, 614, 616 where first it is determined whether the resource control parameter breaches the constraint, and then either the unmodified resource control parameter or a constrained resource control parameter is used for controlling resource allocation or manage contention for resources. If no error reporting is required, then an equivalent approach can be to omit any determination of whether the given resource control parameter breaches the constraint, but instead simply to combine the given resource control parameter and the constraint in such a way that the result of the combination is either the original given resource control parameter (in cases where the parameter did not breach the constraint) or corresponds to the limit indicated by the constraint (in cases where the parameter did breach the constraint). For example, for the portion-based approach, the effective value of the portion bitmap 502 to use for controlling resource allocation could be generated by bitwise ANDing the portion bitmap 502 with the inverse of the mask bitmap 500 representing the constraint, similar to the bitwise AND function described above for controlling updates of the portion bitmap 502 in the earlier example (alternatively, with a different encoding of the portion bitmap 502 or the mask bitmap 500, a different function of logical operators could be used to combine them to generate the effective value to use for resource control). For the threshold based approach, the effective value of the cache capacity or min/max bandwidth allocation threshold to use for handling resource allocation or contention management can be determined as the minimum of the stored value of the threshold and the threshold represented by the constraint (similar to the approach in FIGS. 16 and 17). Hence, it will be appreciated that, if error reporting is not required, then an actual determination of whether the stored resource control parameter breached the constraint is not essential.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to process instructions from one of a plurality of software execution environments; and
a memory system component to handle memory transactions issued by the processing circuitry in response to the instructions; in which:
in response to a memory transaction issued by the processing circuitry specifying a partition identifier selected depending on which software execution environment caused the memory transaction to be issued, the memory system component is configured to control allocation of resources for handling the memory transaction or manage contention for said resources depending on a selected set of one or more memory system component resource control parameters, said selected set selected from among a plurality of sets of one or more memory system component resource control parameters depending on the partition identifier specified by the memory transaction;
the memory system component comprises programmable constraint storage circuitry to store at least one resource control parameter constraint specifying at least one of:
a bound on a value allowed to be set for a target memory system component resource control parameter during an update of the target memory system component resource control parameter; and
a bound on an effective value of the target memory system component resource control parameter to be used, at the time of processing a memory system transaction, to control said allocation of resources or managing contention for said resources; and
based on said at least one resource control parameter constraint stored in said programmable constraint storage circuitry, the memory system component is configured to constrain at least one of:
updating of the target memory system component resource control parameter; and
usage of the target memory system component resource control parameter for controlling said allocation of resources or managing contention for said resources.

2. The apparatus according to claim 1, in which the processing circuitry has a plurality of operating states including a restricted subset of operating states, the restricted subset comprising at least one of said plurality of operating states;
the programmable constraint storage circuitry is programmable in response to a constraint update request issued by the processing circuitry when in one of said restricted subset of operating states; and
programming of the programmable constraint storage circuitry is prohibited in response to a constraint update request issued by the processing circuitry when in an operating state other than said restricted subset of operating states.

3. The apparatus according to claim 2, in which the processing circuitry is configured to operate in one of a secure domain and a less secure domain, and when operating in the less secure domain, the processing circuitry is configured to prohibit access to addresses reserved for access by the secure domain; and
said restricted subset of operating states comprises at least one operating state in which the processing circuitry operates in the secure domain.

4. The apparatus according to claim 1, in which when the programmable constraint storage circuitry is reprogrammed to update said at least one resource control parameter constraint to a new value, and a current value of a given memory system component resource control parameter breaches a constraint indicated by the new value of said at least one resource control parameter constraint:
the memory system component is configured to retain said current value of said given memory system component resource control parameter, regardless of the breach of the constraint indicated by the new value of said at least one resource control parameter constraint.

5. The apparatus according to claim 1, in which:
in response to a parameter update request requesting an update of the target memory system component resource control parameter, the memory system component is configured to constrain the update of the target memory system component resource control parameter based on the at least one resource control parameter constraint stored in said programmable constraint storage circuitry.

6. The apparatus according to claim 5, in which:
in response to the parameter update request requesting that the target memory system component resource control parameter is updated to a new value, when the new value breaches the at least one resource control parameter constraint, the memory system component is configured to set the target memory system component resource control parameter to a value which satisfies the at least one resource control parameter constraint.

7. The apparatus according to claim 5, in which:
in response to the parameter update request requesting that the target memory system component resource control parameter is updated to a new value, when the new value breaches the at least one resource control parameter constraint, the memory system component is configured to perform an error reporting action;
the error reporting action comprising at least one of:
recording error reporting information in an error reporting storage element; and
signalling an interrupt.

8. The apparatus according to claim 7, in which in response to the parameter update request requesting that the target memory system component resource control parameter is updated to a new value, when the new value breaches the at least one resource control parameter constraint, the memory system component is configured to select whether to perform said error reporting action depending on programmable configuration information stored in a configuration storage element.

9. The apparatus according to claim 1, in which in response to said memory transaction issued by the processing circuitry, when the memory transaction is a constrained type of memory transaction, the memory system component is configured to:
when a given resource control parameter in the selected set of one or more memory system component resource control parameters satisfies the corresponding resource control parameter constraint, control said allocation of resources or manage contention for said resources based on the given resource control parameter; and
when the given resource control parameter breaches the corresponding resource control parameter constraint, control said allocation of resources or manage contention for said resources based on a constrained resource control parameter determined based on the corresponding resource control parameter constraint.

10. The apparatus according to claim 9, in which said memory system component is configured to determine whether the memory transaction is said constrained type of memory transaction based on at least one identifier specified by the memory transaction.

11. The apparatus according to claim 10, in which said at least one identifier comprises at least one of:
the partition identifier;
a privilege level identifier indicating a level of privilege associated with the memory transaction;
a security domain identifier indicating a security domain associated with the memory transaction; and
a constraint exemption identifier indicating whether the memory transaction is exempt from being constrained based on the corresponding resource control parameter constraint.

12. The apparatus according to claim 1, in which in response to a reset signal indicating that the apparatus is to be reset to a predetermined state, the programmable constraint storage circuitry is configured to reset said at least one resource control parameter constraint to a value indicating that updating or usage of said plurality of sets of one or more memory system component resource control parameters is unconstrained.

13. The apparatus according to claim 1, in which for a given memory system component, each set of one or more memory system component resource control parameters is associated with a corresponding partition identifier and comprises a portion-based resource allocation control parameter specifying, for each of a plurality of portions of resource, whether that portion of resource is allowed to be allocated for use by a software execution environment associated with the corresponding partition identifier;
in which the at least one resource control parameter constraint comprises a portion-based constraint specifying, for each of a subset of portions among said plurality of portions of resource, at least one of:
whether the portion-based resource allocation control parameter is allowed to be updated to indicate that portion of resource as being allowed to be allocated; and
whether, when using the portion-based resource allocation control parameter for controlling said allocation of resources for a constrained type of memory transaction, the given memory system component should prevent that portion of resource being allocated even if the portion-based resource allocation control parameter specifies that portion of resource as being allowed to be allocated.

14. The apparatus according to claim 13, in which said subset of portions excludes at least one of said plurality of portions of resource.

15. The apparatus according to claim 13, in which:
in response to a parameter update request requesting that the portion-based resource allocation control parameter is to be updated to indicate that a given portion of resource is allowed to be allocated, when the portion-based constraint specifies that the portion-based resource allocation control parameter is prohibited from being updated to indicate the given portion as being allowed to be allocated, the given memory system component is configured to set the portion-based resource allocation control parameter to indicate that the given portion of resource is prohibited from being allocated.

16. The apparatus according to claim 1, in which for a given memory system component, each set of one or more memory system component resource control parameters is associated with a corresponding partition identifier and comprises a resource allocation threshold parameter indicative of a maximum or minimum threshold for controlling allocation of resource, or management of contention for resource, for a software execution environment associated with the corresponding partition identifier;
the at least one resource control parameter constraint comprises a threshold cap constraint indicative of a threshold cap value; and
at least one of:
in response to the parameter update request requesting an update of said resource allocation threshold parameter, the given memory system component is configured to prohibit the resource allocation threshold parameter being updated to indicate, as the maximum or minimum threshold, a threshold greater than the threshold cap value indicated by the threshold cap constraint; and in response to said memory transaction issued by the processing circuitry, when the memory transaction is a constrained type of memory transaction and the resource allocation threshold parameter breaches the threshold cap constraint, the given memory system component is configured to control allocation of resources or management of contention for resource based on a constrained threshold value less than or equal to the threshold cap value indicated by the threshold cap constraint.

17. The apparatus according to claim 16, in which in response to the parameter update request requesting the update of said resource allocation threshold parameter, the given memory system component is configured to set the resource allocation threshold parameter to indicate a minimum of:

a new threshold specified by the parameter update request; and the threshold cap value indicated by the threshold cap constraint.

18. The apparatus according to claim 16, in which in response to said memory transaction issued by the processing circuitry, when the memory transaction is a constrained type of memory transaction, the given memory system component is configured to control allocation of resources or management of contention for resource based on a minimum of a threshold value indicated by the resource allocation threshold parameter and the threshold cap value indicated by the threshold cap constraint.

19. An apparatus comprising:

processing circuitry to process instructions from one of a plurality of software execution environments; and a memory system component to handle memory transactions issued by the processing circuitry in response to the instructions; in which:

in response to a memory transaction issued by the processing circuitry specifying a partition identifier selected depending on which software execution environment caused the memory transaction to be issued, the memory system component is configured to control allocation of resources for handling the memory transaction or manage contention for said resources depending on a selected set of one or more memory system component resource control parameters, said selected set selected from among a plurality of sets of one or more memory system component resource control parameters depending on the partition identifier specified by the memory transaction;

the memory system component comprises programmable constraint storage circuitry to store at least one resource control parameter constraint;

based on said at least one resource control parameter constraint stored in said programmable constraint storage circuitry, the memory system component is configured to constrain at least one of:

updating of a target memory system component resource control parameter; and usage of the target memory system component resource control parameter for controlling said allocation of resources or managing contention for said resources;

for a given memory system component, each set of one or more memory system component resource control parameters is associated with a corresponding partition identifier and comprises a portion-based resource allocation control parameter specifying, for each of a plurality of portions of resource, whether that portion of resource is allowed to be allocated for use by a software execution environment associated with the corresponding partition identifier; and the at least one resource control parameter constraint comprises a portion-based constraint specifying, for each of a subset of portions among said plurality of portions of resource, at least one of:

whether the portion-based resource allocation control parameter is allowed to be updated to indicate that portion of resource as being allowed to be allocated; and whether, when using the portion-based resource allocation control parameter for controlling said allocation of resources for a constrained type of memory transaction, the given memory system component should prevent that portion of resource being allocated even if the portion-based resource allocation control parameter specifies that portion of resource as being allowed to be allocated.

20. An apparatus comprising:

processing circuitry to process instructions from one of a plurality of software execution environments; and a memory system component to handle memory transactions issued by the processing circuitry in response to the instructions; in which:

in response to a memory transaction issued by the processing circuitry specifying a partition identifier selected depending on which software execution environment caused the memory transaction to be issued, the memory system component is configured to control allocation of resources for handling the memory transaction or manage contention for said resources depending on a selected set of one or more memory system component resource control parameters, said selected set selected from among a plurality of sets of one or more memory system component resource control parameters depending on the partition identifier specified by the memory transaction;

the memory system component comprises programmable constraint storage circuitry to store at least one resource control parameter constraint;

based on said at least one resource control parameter constraint stored in said programmable constraint storage circuitry, the memory system component is configured to constrain at least one of:

updating of a target memory system component resource control parameter; and usage of the target memory system component resource control parameter for controlling said allocation of resources or managing contention for said resources;

for a given memory system component, each set of one or more memory system component resource control parameters is associated with a corresponding partition identifier and comprises a resource allocation threshold parameter indicative of a maximum or minimum threshold for controlling allocation of resource, or management of contention for resource, for a software execution environment associated with the corresponding partition identifier;

the at least one resource control parameter constraint comprises a threshold cap constraint indicative of a threshold cap value; and at least one of:
- in response to the parameter update request requesting an update of said resource allocation threshold parameter, the given memory system component is configured to prohibit the resource allocation threshold parameter being updated to indicate, as the maximum or minimum threshold, a threshold greater than the threshold cap value indicated by the threshold cap constraint; and
- in response to said memory transaction issued by the processing circuitry, when the memory transaction is a constrained type of memory transaction and the resource allocation threshold parameter breaches the threshold cap constraint, the given memory system component is configured to control allocation of resources or management of contention for resource based on a constrained threshold value less than or equal to the threshold cap value indicated by the threshold cap constraint.

* * * * *